US010791567B2

(12) United States Patent
Sun et al.

(10) Patent No.: US 10,791,567 B2
(45) Date of Patent: Sep. 29, 2020

(54) OVERLAPPING CONTROL RESOURCE SETS WITH DIFFERENT PRIORITY LEVELS

(71) Applicant: QUALCOMM Incorporated, San Diego, CA (US)

(72) Inventors: Jing Sun, San Diego, CA (US); Wanshi Chen, San Diego, CA (US); Peter Gaal, San Diego, CA (US); Juan Montojo, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 65 days.

(21) Appl. No.: 16/045,524

(22) Filed: Jul. 25, 2018

(65) Prior Publication Data

US 2019/0037577 A1 Jan. 31, 2019

Related U.S. Application Data

(60) Provisional application No. 62/538,612, filed on Jul. 28, 2017.

(51) Int. Cl.
*H04L 5/00* (2006.01)
*H04W 24/02* (2009.01)
(Continued)

(52) U.S. Cl.
CPC .......... *H04W 72/10* (2013.01); *H04L 5/0016* (2013.01); *H04L 5/0053* (2013.01); *H04L 5/0064* (2013.01); *H04L 5/0094* (2013.01); *H04L 41/0813* (2013.01); *H04L 41/0866* (2013.01); *H04L 43/0876* (2013.01); *H04W 72/048* (2013.01); *H04W 72/042* (2013.01)

(58) Field of Classification Search
None
See application file for complete search history.

(56) References Cited

U.S. PATENT DOCUMENTS

2014/0126484 A1\* 5/2014 Chen ..................... H04L 5/0055
370/329
2017/0142694 A1 5/2017 Yerramalli et al.
(Continued)

FOREIGN PATENT DOCUMENTS

WO  WO-2016161316 A1  10/2016
WO  WO-2017078854 A1  5/2017

OTHER PUBLICATIONS

International Search Report and Written Opinion—PCT/US2018/043895—ISA/EPO—dated Oct. 11, 2018.

*Primary Examiner* — Duc T Duong
(74) *Attorney, Agent, or Firm* — Holland & Hart LLP

(57) ABSTRACT

Methods, systems, and devices for wireless communication are described. One method may include receiving, at user equipment (UE), a control resource set configuration message from a base station; identifying an overlap between a first control resource set and a second control resource set of a wireless channel; identifying a priority level of the first control resource set and a priority level of the second control resource set based on the control resource set configuration message; and monitoring the first control resource set based on the identified overlap, the priority level of the first control resource set, and the priority level of the second control resource set.

36 Claims, 16 Drawing Sheets

(51) Int. Cl.
  *H04W 24/04*    (2009.01)
  *H04W 72/10*    (2009.01)
  *H04L 12/24*    (2006.01)
  *H04L 12/26*    (2006.01)
  *H04W 72/04*    (2009.01)

(56) References Cited

U.S. PATENT DOCUMENTS

| | | |
|---|---|---|
| 2018/0035332 A1* | 2/2018 | Agiwal ............. H04W 74/0858 |
| 2018/0220400 A1* | 8/2018 | Nogami ................ H04L 5/0078 |
| 2018/0279289 A1* | 9/2018 | Islam .................... H04L 5/0094 |
| 2018/0279297 A1* | 9/2018 | Nogami .................... H04L 1/08 |
| 2018/0324688 A1* | 11/2018 | Li .......................... H04W 48/16 |
| 2019/0103941 A1* | 4/2019 | Seo ....................... H04L 5/0053 |
| 2019/0190629 A1* | 6/2019 | Lin ....................... H04W 24/10 |
| 2019/0200332 A1* | 6/2019 | Hwang ................ H04L 5/0051 |
| 2019/0357198 A1* | 11/2019 | Xiong ................ H04W 72/048 |
| 2019/0357226 A1* | 11/2019 | Lin .................... H04W 72/042 |

\* cited by examiner

OVERLAPPING CONTROL RESOURCE SETS WITH DIFFERENT PRIORITY LEVELS

CROSS REFERENCES

The present Application for Patent claims the benefit of U.S. Provisional Patent Application No. 62/538,612 by SUN, et al., entitled "OVERLAPPING CONTROL RESOURCE SETS WITH DIFFERENT PRIORITY LEVELS," filed Jul. 28, 2017, assigned to the assignee hereof, and expressly incorporated herein.

BACKGROUND

The following relates generally to wireless communication and to techniques for managing overlapping control resource sets in a wireless communications system.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A control resource set contains time and frequency resources allocated for the transmission of control information from a base station to a UE. The UE may tune to one or more designated control resource sets to receive control information from the base station. In some cases, time and frequency resources of one control resource set may overlap with the time and frequency resources of another control resource set.

SUMMARY

The described techniques relate to improved methods, systems, devices, and apparatuses that support managing overlapping control resource sets in a wireless communications system. A UE may be configured to monitor overlapping control resource sets. An overlap between control resource sets may occur when two or more control resource sets use a same portion of a resource block (i.e., time and frequency resources). For example, a common control resource set and a UE-specific control resource set may partially occupy a same subband and span a same OFDM symbol, resulting in a partial overlap between the control resource sets. In some cases, a control resource set may be discontinuous over a portion of the resource block. For example, some control resource sets may be discontinuous over frequency resources (e.g., subbands) of a resource block, but may be continuous over time resources (e.g., OFDM symbols) of the resource block. Additionally, or alternatively, some control resource sets may be continuous over frequency resources and discontinuous over time resources.

When a UE decodes control information transmitted over a control resource set, the UE may follow a search space definition to locate the resources used for the downlink control information (e.g., time and frequency resource). However, when a UE is configured to monitor two or more overlapping control resource sets, one downlink control information transmission in one control resource set may use resources used by multiple downlink control information transmissions in the other control resource set, making it difficult for the gNB to schedule downlink control information transmissions for multiple UEs monitoring either control resource set. According to the principles of this disclosure, a UE communicating with a base station in a wireless communication system may assign different priority levels to overlapping control resource sets and use this prioritization scheme to simplify the process of decoding control information. The different priority levels assigned to different control resource sets may, for example, determine which portions of each control resource set are monitored by the UE for downlink control information decoding.

A method for wireless communication at a UE is described. The method may include receiving a control resource set configuration message from a base station, identifying an overlap between a first control resource set and a second control resource set of a wireless channel, identifying a priority level of the first control resource set and a priority level of the second control resource set based at least in part on the control resource set configuration message, and monitoring the first control resource set based at least in part on the identified overlap, the priority level of the first control resource set, and the priority level of the second control resource set.

An apparatus for wireless communication is described. The apparatus may include means for receiving a control resource set configuration message from a base station, means for identifying an overlap between a first control resource set and a second control resource set of a wireless channel, means for identifying a priority level of the first control resource set and a priority level of the second control resource set based at least in part on the control resource set configuration message, and means for monitoring the first control resource set based at least in part on the identified overlap, the priority level of the first control resource set, and the priority level of the second control resource set.

Another apparatus for wireless communication is described. The apparatus may include a processor, memory in electronic communication with the processor. The processor and memory may be configured to receive a control resource set configuration message from a base station, identify an overlap between a first control resource set and a second control resource set of a wireless channel, identify a priority level of the first control resource set and a priority level of the second control resource set based at least in part on the control resource set configuration message, and monitor the first control resource set based at least in part on the identified overlap, the priority level of the first control resource set, and the priority level of the second control resource set.

A non-transitory computer readable medium for wireless communication is described. The non-transitory computer-readable medium may include instructions operable to cause a processor to receive a control resource set configuration message from a base station, identify an overlap between a first control resource set and a second control resource set of a wireless channel, identify a priority level of the first control resource set and a priority level of the second control resource set based at least in part on the control resource set configuration message, and monitor the first control resource set based at least in part on the identified overlap, the priority level of the first control resource set, and the priority level of the second control resource set.

In some examples of the method, apparatus, and non-transitory computer-readable medium described above, the monitoring the first control resource set may be based at least in part on determining that the identified priority level of the first control resource set and the identified priority level of the second control resource set may be different. Some examples of the method, apparatus, and non-transitory computer-readable medium described above may further include processes, features, means, or instructions for determining that the identified priority level of the first control resource set may be lower than the identified priority level of the second control resource set. Some examples of the method, apparatus, and non-transitory computer-readable medium described above may further include processes, features, means, or instructions for identifying a portion of overlapping resources associated with the first control resource set and the second control resource set.

Some examples of the method, apparatus, and non-transitory computer-readable medium described above may further include processes, features, means, or instructions for removing from the first control resource set the portion of overlapping resources associated with the first control resource set, wherein the portion of overlapping resources overlap with a portion of the second control resource set. Some examples of the method, apparatus, and non-transitory computer-readable medium described above may further include processes, features, means, or instructions for obtaining a remaining portion of the first control resource set based at least in part on the removed overlapping resources, wherein the remaining portion of the first control resource set comprises a portion of non-overlapping resources.

Some examples of the method, apparatus, and non-transitory computer-readable medium described above may further include processes, features, means, or instructions for updating a monitoring configuration of the UE for the first control resource set based at least in part on the identified overlapping resources. Some examples of the method, apparatus, and non-transitory computer-readable medium described above may further include processes, features, means, or instructions for configuring the UE to refrain from monitoring a portion of the first control resource set overlapping with the second control resource set.

Some examples of the method, apparatus, and non-transitory computer-readable medium described above may further include processes, features, means, or instructions for performing a blind decoding of downlink control information based at least in part on all downlink control information transmissions in the first control resource set rate match around the portion of overlapping resources associated with the first control resource set.

In some examples of the method, apparatus, and non-transitory computer-readable medium described above, the first control resource set comprises a time first mapping control resource set. Some examples of the method, apparatus, and non-transitory computer-readable medium described above may further include processes, features, means, or instructions for performing a blind decoding of downlink control information based at least in part on all downlink control information transmissions in the first control resource set rate match around resources sharing a same frequency domain resource with the portion of overlapping resources associated with the first control resource set.

In some examples of the method, apparatus, and non-transitory computer-readable medium described above, the first control resource set comprises a frequency first mapping control resource set. Some examples of the method, apparatus, and non-transitory computer-readable medium described above may further include processes, features, means, or instructions for performing a blind decoding of downlink control information based at least in part on all downlink control information transmissions in the first control resource set rate match around resources that overlap with the second control resource set.

Some examples of the method, apparatus, and non-transitory computer-readable medium described above may further include processes, features, means, or instructions for performing a blind decoding of downlink control information at a candidate downlink control information transmission based at least in part on a candidate downlink control information transmission location in the first control resource set may be selected, wherein resources used by the candidate downlink control information transmission may be non-overlapping with the second control resource set.

Some examples of the method, apparatus, and non-transitory computer-readable medium described above may further include processes, features, means, or instructions for performing a blind decoding of downlink control information at a candidate downlink control information transmission based at least in part on a candidate downlink control information transmission location in the first control resource set may be selected prior to identifying the overlap with the second control resource set, wherein resources used by the candidate downlink control information transmission may be partially overlapping with the second control resource set.

Some examples of the method, apparatus, and non-transitory computer-readable medium described above may further include processes, features, means, or instructions for performing a blind decoding of downlink control information based at least in part on a candidate downlink control information transmission being partially overlapping with the second control resource set, wherein the downlink control information may be being transmitted within a non-overlapping portion of resources allocated to the candidate downlink control information transmission. In some examples of the method, apparatus, and non-transitory computer-readable medium described above, the priority level of the second control resource set may be based at least in part on a default priority level.

A method of wireless communication at a base station is described. The method may include assigning a first priority level to a first control resource set and a second priority level to a second control resource set, generating a control resource set configuration message comprising an indication of a priority level of one or more of the control resource sets of a wireless channel, and transmitting the control resource set configuration message to a UE over the wireless channel.

An apparatus for wireless communication is described. The apparatus may include means for assigning a first priority level to a first control resource set and a second priority level to a second control resource set, means for generating a control resource set configuration message comprising an indication of a priority level of one or more of the control resource sets of a wireless channel, and means for transmitting the control resource set configuration message to a UE over the wireless channel.

Another apparatus for wireless communication is described. The apparatus may include a processor, memory in electronic communication with the processor, and instructions stored in the memory. The instructions may be operable to cause the processor to assign a first priority level to a first control resource set and a second priority level to a second control resource set, generate a control resource set configuration message comprising an indication of a priority level of one or more of the control resource sets of a wireless channel, and transmit the control resource set configuration message to a UE over the wireless channel.

A non-transitory computer readable medium for wireless communication is described. The non-transitory computer-readable medium may include instructions operable to cause a processor to assign a first priority level to a first control resource set and a second priority level to a second control resource set, generate a control resource set configuration message comprising an indication of a priority level of one or more of the control resource sets of a wireless channel, and transmit the control resource set configuration message to a UE over the wireless channel.

In some examples of the method, apparatus, and non-transitory computer-readable medium described above, the control resource set configuration message may be transmitted during a radio resource control (RRC) connection procedure. In some examples of the method, apparatus, and non-transitory computer-readable medium described above, the first control resource set or the second control resource set may be UE-specific.

In some examples of the method, apparatus, and non-transitory computer-readable medium described above, the first control resource set or the second control resource set may be a common control resource set. Some examples of the method, apparatus, and non-transitory computer-readable medium described above may further include processes, features, means, or instructions for assigning a default priority level to at least one control resource set, wherein the control resource set configuration message comprises an indication of the default priority level of the at least one control resource set. Some examples of the method, apparatus, and non-transitory computer-readable medium described above may further include processes, features, means, or instructions for configuring the UE to refrain from monitoring a portion of a first control resource set overlapping with a second control resource set.

DETAILED DESCRIPTION

A base station may configure a UE to monitor one or more control resource sets. For example, this configuration may occur during a radio resource control (RRC) connection procedure. In some cases, the UE may be configured to monitor two or more overlapping control resource sets. When an overlap occurs between control resource sets, different priority levels may be associated with different control resource sets. These priority levels may be expressly or implicitly signaled to the UE (e.g., using RRC signaling), or the UE may assign default values to different types of control resource sets.

When the UE is configured with a new or updated group of control resource sets to monitor, the UE may determine whether any of the control resource sets overlap and the priority level of each overlapping control resource set. If the overlapping control resource sets have the same priority level, the UE may be configured to monitor and decode each control resource set independently. If the overlapping control resource sets have different priority levels, for example a first control resource set has a lower priority level than a second control resource set, the UE may monitor an entirety of the second control resource set because of the higher assigned priority level. The UE may monitor and decode less than an entirety of the first control resource set based on the identified overlap. For example, the UE may monitor and decode a non-overlapping portion of the first control resource set. By limiting decoding and rate matching operations to the non-overlapping portion of the first control resource set, the downlink control information transmitted in the first control resource set will not be blocked by the higher priority level second control resource set and more downlink control information can be transmitted.

Aspects of the disclosure are initially described in the context of a wireless communications system. Exemplary UEs and base stations (e.g., evolved NodeBs (eNBs), next generation NodeBs (gNBs)), systems, and process flow that support managing overlapping control resource sets with different priority levels are then described. Aspects of the disclosure are further illustrated by and described with reference to apparatus diagrams, system diagrams, and flowcharts that relate to managing overlapping control resource sets with different priority levels.

Figure 1:
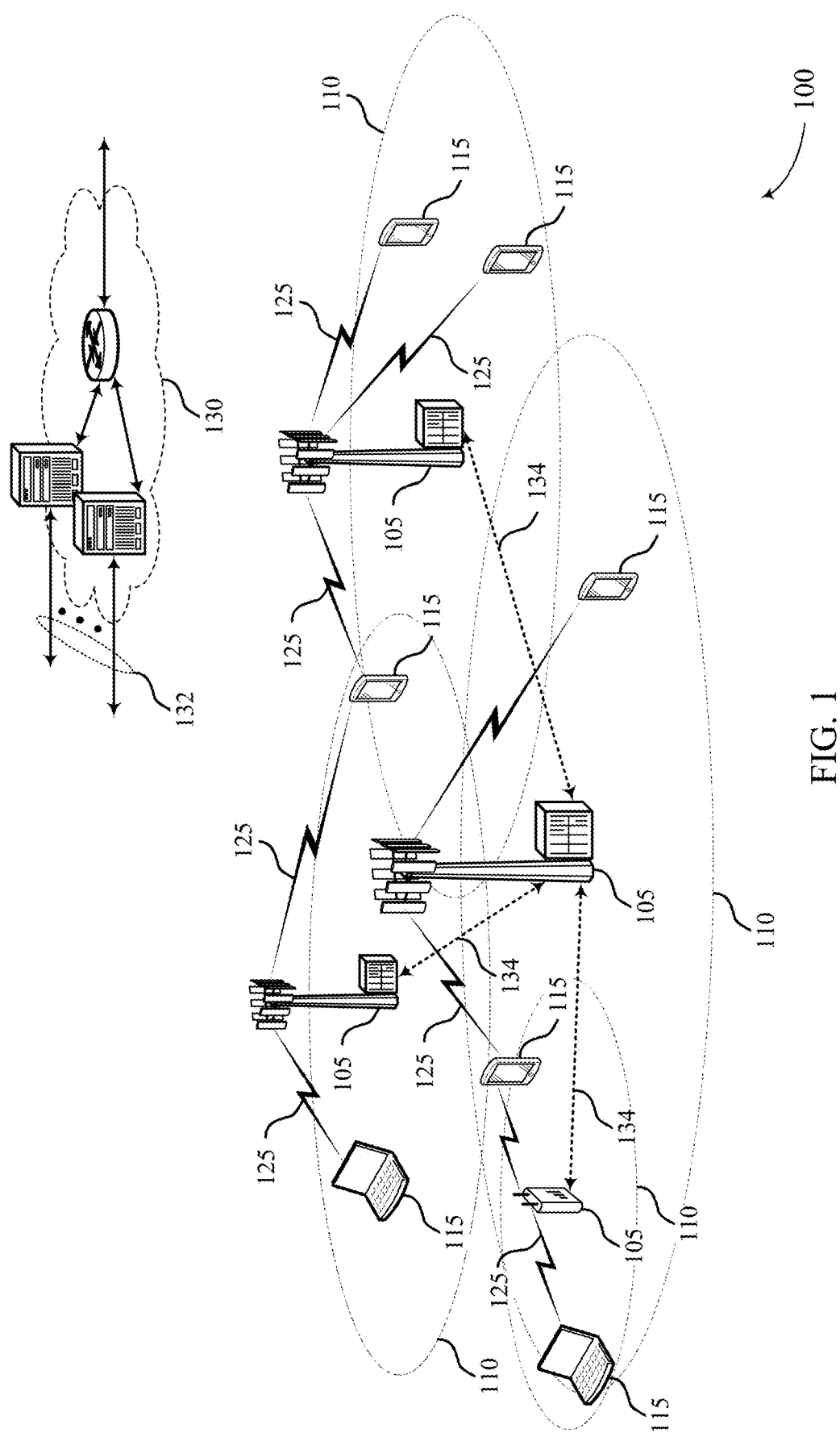
FIG. 1 illustrates an example of a system for wireless communication that supports managing overlapping control resource sets with different priority levels in accordance with aspects of the present disclosure.

FIG. 1 illustrates an example of a system 100 for wireless communication that supports managing overlapping control resource sets with different priority levels in accordance with aspects of the present disclosure. The system 100 includes base stations 105, UEs 115, and a core network 130. In some examples, the system 100 may be a Long Term Evolution (LTE) network, an LTE-Advanced (LTE-A) network, or a New Radio (NR)/5G network. In some cases, system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. System 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

UE 115 may be configured to monitor overlapping control resource sets. An overlap between control resource sets may occur when two or more control resource sets use a same portion of a resource block (i.e., time and frequency resources). For example, a common control resource set and a UE-specific control resource set may partially occupy a same subband and span a same OFDM symbol. In some cases, a control resource set may be discontinuous over a portion of the resource block. For example, a control resource set may be discontinuous over frequency resources of a resource block and may be continuous over time resources.

In some cases, the UE 115 may decode the received control information. Within a configured control resource set, the UE 115 may be configured to perform a set of blind decoding of downlink control information. Each candidate downlink control information may be placed in a different set of resources of the control resource set. The set of blind decodings of downlink control information forms a search space. The base station 105 may pick one of the candidate blind decoding locations to send the downlink control information to the UE 115. For the example, UE 115 may receive downlink control information (DCI) as part of a control resource set. The DCI may include downlink and uplink grants, uplink power control commands, etc. However, in scenarios where control resource sets overlap, a downlink control information transmission to one UE in one control resource set may occupy resources used by many downlink control information transmissions to other UEs 115 configured to monitor the other control resource set. Thus, the other UEs 115 may not be served in the other control resource set due to lack of resources. Accordingly, the UE 115 may select the resources that are monitored from each overlapping control resource set based on a priority level assigned to each control resource set. In this way, multiple UEs 115 may be served by overlapping control resource sets, and each UE 115 may identify which resources to monitor in an overlapping control resource set based on the assigned priority levels. This employment of overlapping control resource sets allows for reuse of resources, thereby improving the efficiency of the system 100.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The system 100 may include, for example, a heterogeneous LTE/LTE-A or NR network in which different types of base stations 105 provide coverage for various geographic coverage areas 110.

The term "cell" refers to a logical communication entity used for communication between a base station 105 and a UE 115 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an Si or other interface). Base stations 105 may communicate with one another over backhaul links 134 (e.g., via an X2 or other interface) either directly (e.g., directly between base stations 105) or indirectly (e.g., via core network 130). The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

System 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz. System 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

System 100 may also operate in an extremely high frequency (EHF) region of the spectrum (e.g., from around 27 GHz to around 300 GHz), also known as the millimeter band. In some examples, system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, system 100 may utilize both licensed and unlicensed radio frequency spectrum bands. For example, system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the system 100, and may be referred to as a transmission time interval (TTI). In other cases, a smallest scheduling unit of the system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the system 100 (e.g., base stations 105 or UEs 115) may have a hardware configuration that supports communications over a particular carrier bandwidth, or may be configurable to support communications over one of a set of carrier bandwidths. In some examples, the system 100 may include base stations 105 and/or UEs that can support simultaneous communications via carriers associated with more than one different carrier bandwidth.

System 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
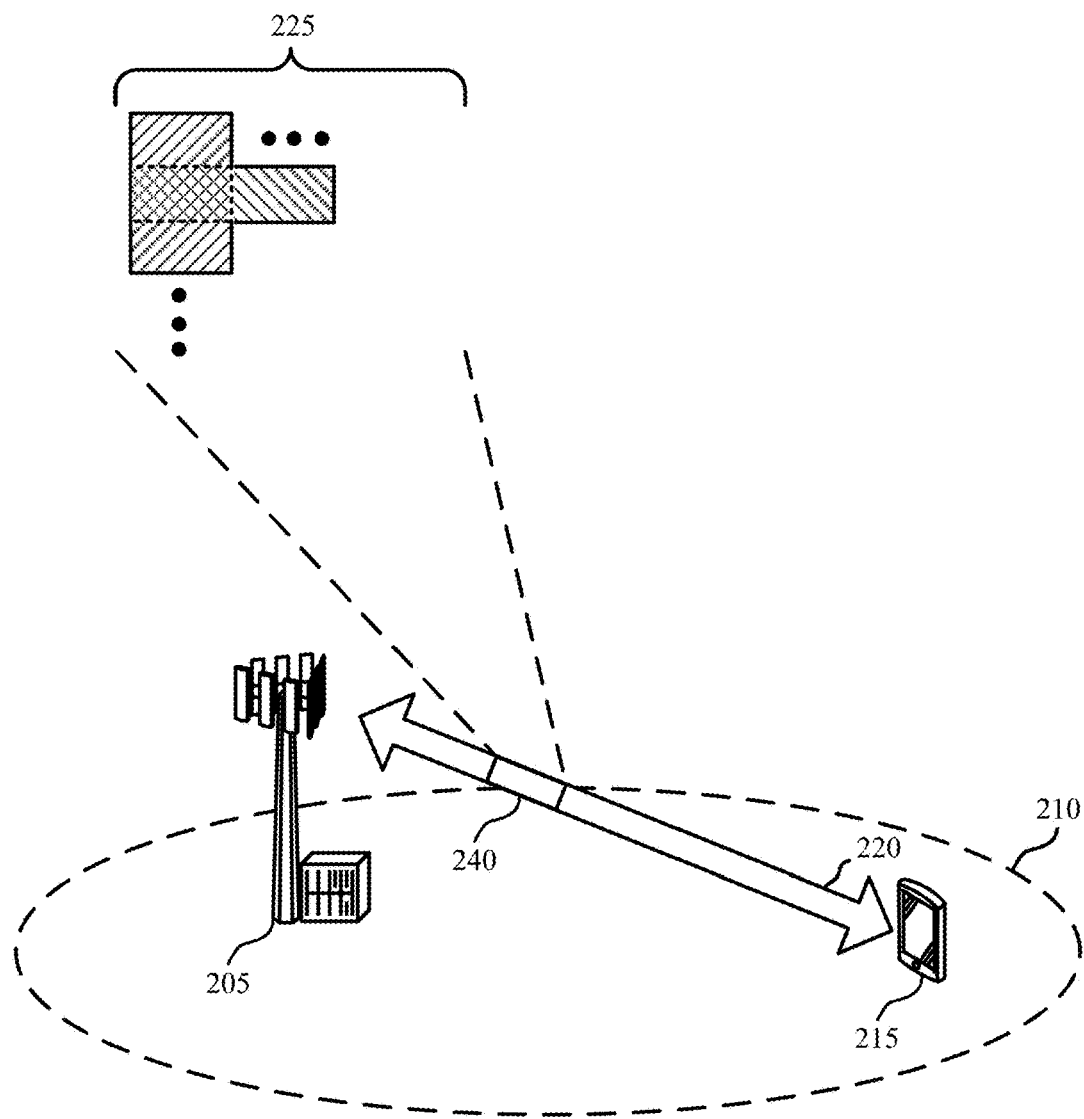
FIG. 2 illustrates an example of a system for wireless communication that supports managing overlapping control resource sets with different priority levels in accordance with aspects of the present disclosure.

FIG. 2 illustrates an example of a system 200 for wireless communication that supports managing overlapping control resource sets with different priority levels in accordance with aspects of the present disclosure. In some examples, system 200 may implement aspects of system 100. System 200 may include a base station 205 and a UE 215, which may be examples of the corresponding devices described with reference to FIG. 1. In the example of FIG. 2, the system 200 may operate according to a radio access technology (RAT) such as a 5G or NR RAT, although techniques described herein may be applied to any RAT and to systems that may concurrently use two or more different RATs.

Base station 205 may establish a connection (e.g., bidirectional link 220) with UE 215 and allocate resources for transmission to UE 215. The resources may be allocated by base station 205 during a RRC connection procedure. In some cases, base station 205 may configure UE 215 to monitor certain control resource sets CRS-0 225 and CRS-1 230 for downlink control information (DCI) transmissions. The DCI transmissions may include downlink grants, uplink grants, uplink power control commands, and other downlink control information. Base station 205 may transmit the control information to UE 215 on a control channel (e.g., PDCCH). In addition, using scheduling commands and scheduling grants, base station 205 may inform UE 215 to forthcoming transmission on a downlink channel (e.g., physical downlink shared channel (PDSCH)) and grant UE 215 resources for transmissions on an uplink channel (e.g., physical uplink shared channel (PUSCH)).

As such, base station 205 may transmit control information to UE 215 via CRS-0 225 and CRS-1 230 during slot 240. The control resource sets may include a region of a resource block for transmission of control information on a wireless channel, e.g., PDCCH. For example, a control resource set may include a number of control channel elements designated for control transmission to UE 215. A control channel element may also include a number of resource element groups. The resource element group may include a number of resource elements, with each resource element being made up of one OFDM symbol and one subcarrier.

The transmission of user data between UE 215 and base station 205 may depend on the successful decoding of downlink control information sent by base station 205 to UE 215 via bidirectional link 220 using the designated control resource sets CRS-0 225 and CRS-1 230. This downlink control information may enable UE 215 to successfully receive, demodulate, and decode wireless transmissions by base station 205. In addition, UE 215 may perform rate matching for the wireless channel. In some cases, however, a control resource set may partially overlap with another control resource set. For example, CRS-0 225 may partially overlap a portion 235 of CRS-1 230. As a result, where control resource sets overlap, performing rate matching by UE 215 for each control resource set may be difficult.

According to the principles of this disclosure, priority levels may be assigned to each overlapping control resource set monitored by UE 215. In some cases, base station 205 may signal a priority level for one or more of the overlapping control resource sets during a RRC connection procedure. For example, base station 205 may indicate a first priority level to CRS-0 225 or a second priority level to CRS-1 230 as part of an RRC Connection Setup or RRC Connection Reconfiguration message transmitted to UE 215 via bidirectional link 220. Additionally, or alternatively, the priority level assigned to one or more of the overlapping control resource sets may be indicated in a master information block (MIB) or system information block (SIB) broadcast by base station 205. In some cases, a priority level for one or more of the overlapping control resource sets may be based on a default priority level assigned by a network operator or known by UE 215 based on a standard implemented by system 200. For example, the priority level for one or more of the overlapping control resource sets may be set to a default level by the UE based on the type of control resource set (e.g., common or UE-specific). The priority level may be indicated to the UE or stored by the UE as a binary value or an integer value. For example, base station 205 may assign a binary value "0" for a low priority level and a binary value "1" for a high priority level. Multiple bits may be used to indicate priority levels in systems implementing more than two priority levels.

The resources of each overlapping control resource set monitored and decoded by UE 215 may depend on the respective priority levels of the overlapping control resource sets. For example, UE 215 may be configured to monitor portions of a low-priority control resource set that do not overlap with a higher-priority control resource set. In the case of system 200, CRS-0 225 may have a lower assigned priority level than CRS-1 230; as such UE 215 may monitor non-overlapping portions of CRS-0 225 and disregard CRS-1 230. That is, UE 215 may be aware of overlap (e.g., overlap a portion 235) between CRS-0 225 and CRS-1 230, and thus avoid resources (e.g., time and frequency resources) that are used by both CRS-0 225 and CRS-1 230. Alternatively, in the case of UE 215 being configured to monitor a control resource set with a higher assigned priority level, UE 215 may not need to be informed of a control resource set with a lower assigned priority level, because UE 215 will ignore the low priority control resource set by default.

In some cases, for partially overlapping control resource sets with a same priority level, UE 215 may be configured to monitor each control resource set independently. In this case, UE 215 may decode each of control resource sets individually and perform rate matching separately on an entirety of each control resource set. In another case, for partially overlapping control resource sets with a different priority level, UE 215 may be configured to monitor and decode an entirety of a higher-priority control resource set while separately monitoring and decoding only a non-overlapping portion of the lower-priority control resource set.

Figure 3:
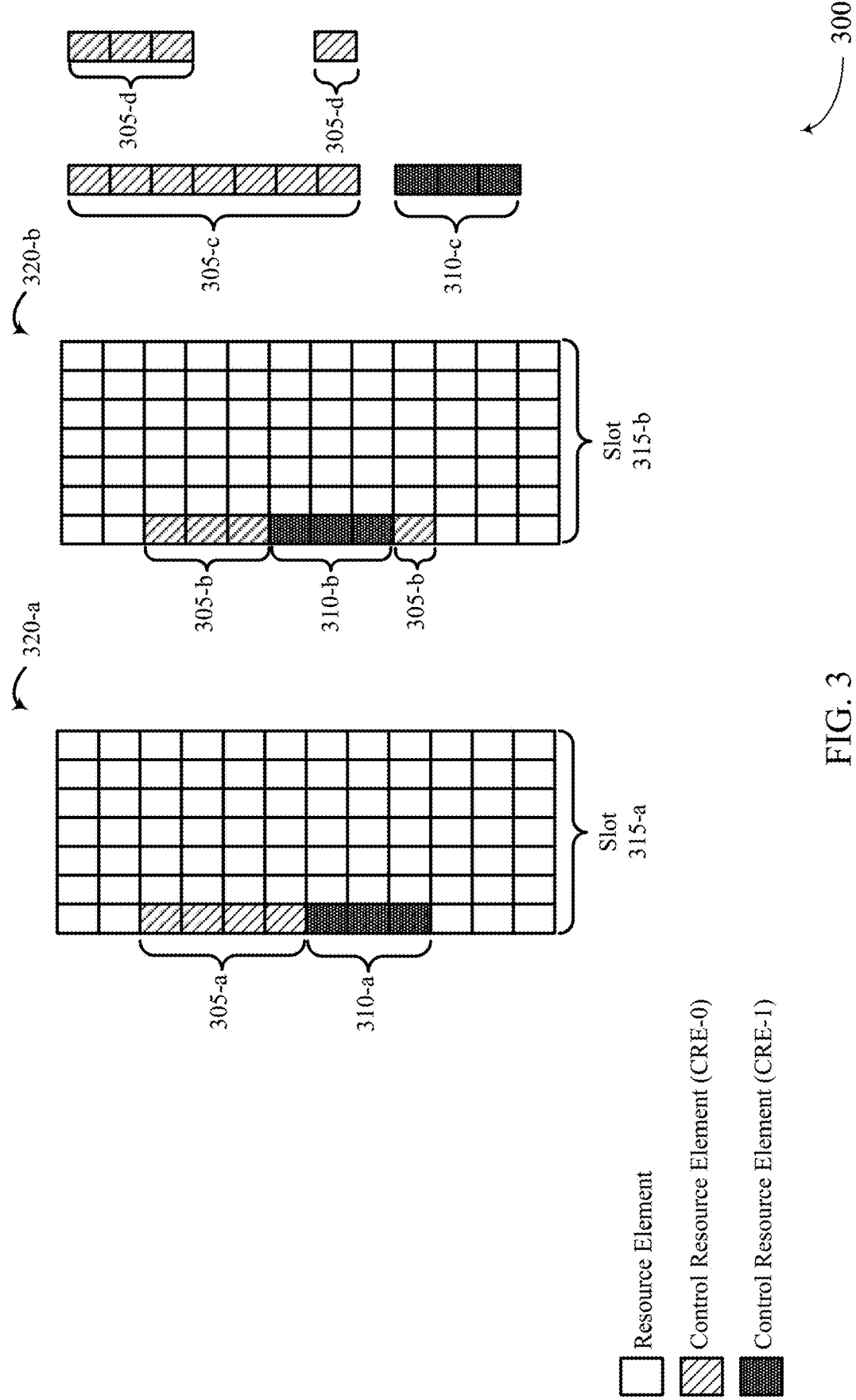
FIGS. 3 through 5 illustrate examples of a configuration that supports managing overlapping control resource sets with different priority levels in accordance with aspects of the present disclosure.

FIG. 3 illustrates an example of a configuration 300 that supports managing overlapping control resource sets with different priority levels in accordance with aspects of the present disclosure. In particular, configuration 300 may support UE 215 performing rate matching by identifying non-overlapping resources.

Configuration 300, for example, depicts resource block 320-a and resource block 320-b. Resource block 320-a may include a number of resource elements. Each resource element of configuration 300 may consist of one OFDM symbol period (e.g., a duration of one modulation symbol) and one subcarrier, where the symbol period and subcarrier spacing are inversely related. In the example of resource block 320-a, control resource set 305-a may include a number of control resource elements (CRE-0) and control resource set 310-a may also include a number of control resource elements (CRE-1).

Base station 205 may assign a priority level to control resource set 305-a and control resource set 310-a based on a type associated with the control resource set. For example, control resource set 305-a and control resource set 310-a may be a common control resource set or a UE-specific control resource set. In the example of FIG. 3, control resource set 305-a may be assigned a lower priority level compared to control resource set 310-a. In this examples, control resource set 305-a may be assigned a lower priority level because it may be a UE-specific control resource set, and control resource set 310-a may be assigned a higher priority level because it may be a common control resource set. In some examples, the common control resource set may be assigned a higher priority level since it is used for initial access procedure. Alternatively, in some cases, both control resource set 305-a and control resource set 310-a may have a same priority level assigned. In the example of FIG. 3, control resource set 305-a may be non-overlapping with control resource set 310-a. In this case, UE 215 may monitor each control resource set individually, as well as decode each of control resource sets independently. Additionally, in this case UE 215 may not have to restructure a search space for decoding a wireless channel (e.g., PDCCH) in control resource set 305-a and control resource set 310-a.

UE 215 may be configured with a search space. Base station 205 may generate control information. The control information may include information about the allocated resources (e.g., time and frequency resources). Base station 205 may map the control information to resource elements of resource blocks 320. These mapped resource elements may be the control resource sets 305-*a* or control resource sets 310-*a*. Base station 205 as a result may transmit the control information in the control resource sets 305-*a* or the control resource sets 310-*a*, or both. In some cases, UE 215 may recover the control information by performing decoding. UE 215 may be aware of resources (e.g., location, time and frequency resources) of the control resource sets 305-*a* or the control resource sets 310-*a*, or both in resource block 320-*a*. That is, UE 215 may be aware of where control information will be transmitted by base station 205 to UE 215 based on the configured search space.

In the non-overlapping scenario, UE 215 may refrain from performing any modification to the configured search space. UE 215 may decode control information (e.g., DCI) carried by one or more wireless channels in the control resource sets 305-*a* or the control resource sets 310-*a*, or both. In some examples, UE 215 may decode control information in a common search space before decoding control information in a UE-specific search space. For example, in the case that control resource set 310-*a* is a common control resource set, UE 215 may decode the control resource set 310-*a* before decoding the control resource set 305-*a* (i.e., UE-specific). However, in some scenarios UE 215 may be required to perform blind decoding as it may be unaware of the detailed control channel structure, including the number of control channels and the number of resource elements to which each control channel is mapped. That is, UE 215 may receive information from base station 205 of a number of OFDM symbols within a control region of slot 315-*a*, without any information associated with the location of corresponding wireless channels (e.g., PDCCHs) for receiving the control information.

On the other hand, resource block 320-*b* may similarly include a number of resource elements. However, in the example of resource block 320-*b* in FIG. 3, control resource set 305-*b* and control resource set 310-*b* may partially overlap. In this case, control resource set 310-*b* may partially overlap in frequency resources with resource block 320-*b*, but may be non-overlapping in timing resources (e.g., OFDM symbols). The configured search space of UE 215 may change based on the partial overlap. In some cases, a property of a control resource set that has a lower assigned priority level (i.e., control resource set 305-*b*), may be also affected when overlapping with a control resource set that has a higher assigned priority level (i.e., control resource set 310-*b*). The property may include a size of the control resource set. For example, control resource set 305-*c* may occupy seven resource elements when it is non-overlapping with control resource set 310-*c*. In the overlapping example, however, control resource set 305-*c* results in a smaller size, i.e., control resource set 305-*d*.

Control resource set 305-*d* may be both discontinuous in frequency resources and smaller than the non-overlapping version (i.e., control resource set 305-*c*). As depicted in FIG. 3, control resource set 305-*d* may include two portions, a first portion including three resources elements and a second portion including a single resource element. In this case, UE 215 may restructure a search space for decoding control resource set 305-*d* and control resource set 310-*c*. In some examples, partial overlap between control resource sets may be dynamic. That is, the overlap may be based on the configuration of the control resource sets by base station 205. Although FIG. 3 depicts both control resource sets as localized in time resources, these control resource sets may also be discontinuous both in frequency and time resources.

Figure 4:
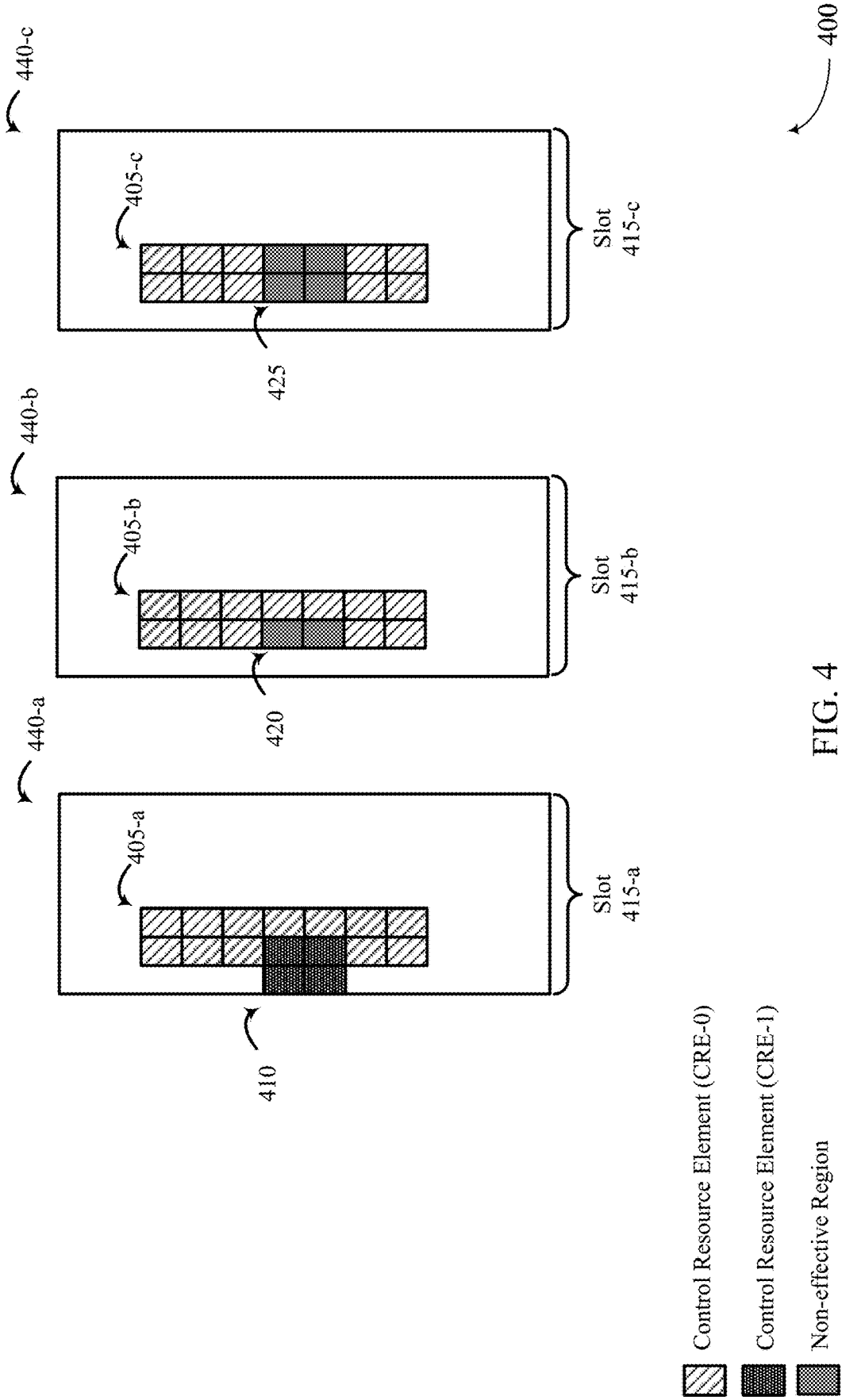

FIG. 4 illustrates an example of a configuration 400 that supports managing overlapping control resource sets with different priority levels in accordance with aspects of the present disclosure. Configuration 400 may support UE 215 performing rate matching on partially overlapping control resource sets. Configuration 400, for example, depicts resource block 440-*a*, resource block 440-*b*, and resource block 440-*c*, collectively known as "resource blocks 440". Resource blocks 440 may include a number of resource elements. Each resource element may include one OFDM symbol and one subcarrier. In the example of resource block 440-*a*, control resource set 410 may include a number of control resource elements (CRE-1), and control resource set 405-*a* may also include a number of control resource elements (CRE-0).

In the example of configuration 400 in FIG. 4, the control resource set 405-*a* may partially overlap in time and frequency resources with control resource set 410. In some cases, performing rate matching on control resource sets that partially overlap in both time and frequency resources may be based on whether UE 215 performs a time first mapping or frequency first mapping on a lower priority control resource set. In the example of FIG. 4, control resource set 405-*a* may have a lower assigned priority level compared to control resource set 410. UE 215 may determine that a priority level of control resource set 405-*a* is lower than a priority level of control resource set 410 based on the received configuration message from base station 205. Upon determining the priority levels, UE 215 may identify a portion of overlapping resources associated with the control resource set 405-*a* and the control resource set 410.

UE 215 may remove the identified portion of overlapping resources from control resource set 405-*a* and obtain a remaining portion of the control resource set 405-*a* (i.e., control resource set 405-*b* of resource block 440-*b*). The remaining portion of the control resource set 405-*a* may include a portion of non-overlapping resources. UE 215 may update a monitoring configuration for the control resource set 405-*b* based on the identified overlapping resources. In some cases, updating the monitoring configuration may configure UE 215 to refrain from monitoring the identified overlapping resources.

Returning to the case of performing rate matching on control resource sets that partially overlap in both time and frequency resources, resource block 440-*b* depicts an effective region of control resource set 405-*b* and a non-effective region 420, as a result of UE 215 performing frequency first mapping. In this case, UE 215 may perform rate matching around all resource elements with partial overlap. UE 215 may perform blind decoding of control information assuming all control information transmissions in the control resource set 405-*b* rate match around resources sharing the same frequency domain resources with the overlapping portion in the control resource set 405-*b*. In contrast, resource block 440-*c* depicts an effective region of control resource set 405-*c* and a non-effective region 425, as a result of UE 215 performing time first mapping. In this case, UE 215 may perform rate matching around overlapping resource element groups only. UE 215 may perform blind decoding of control information assuming all control information transmissions in the control resource set 405-*c* rate match around resources that overlap with the control resource set 410-*a*.

Figure 5:
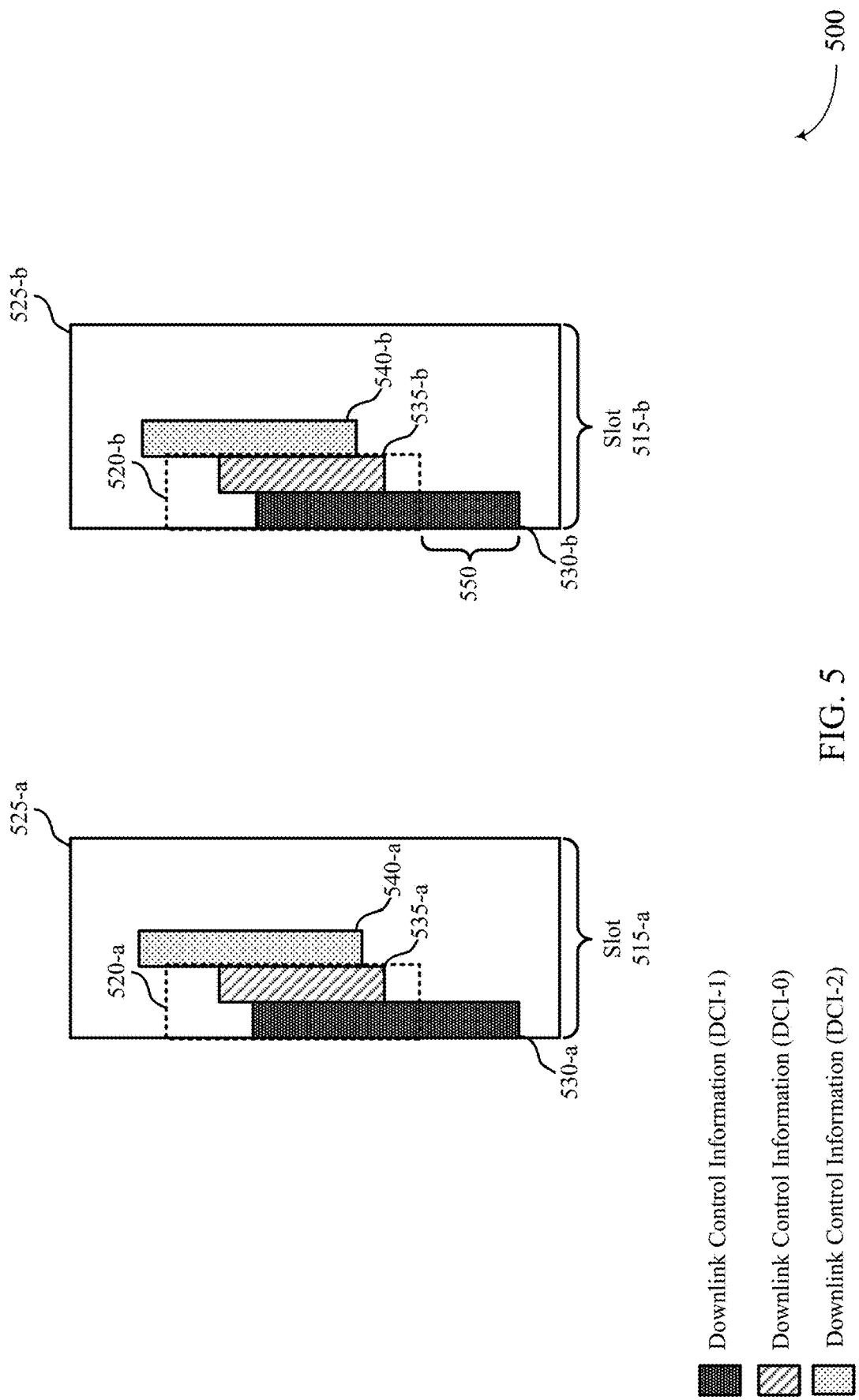

FIG. 5 illustrates an example of a configuration 500 that supports managing overlapping control resource sets with different priority levels in accordance with aspects of the present disclosure. Configuration 500 may support UE 215 performing rate matching on partially overlapping control resource sets. Configuration 500, for example, depicts control resource set 520-*a* and control resource set 525-*a*. According to an example of configuration 500, control resource set 525-*a* may have a lower priority level, and control resource set 520-*a* may have a high priority level. Control resource set 520-*a* may include downlink control information-0 (DCI-0), downlink control information-1 (DCI-1), and downlink control information-2 DCI-2.

UE 215 may identify one or more positions where candidate DCI is to be transmitted to UE 215 from base station 205 i.e., a search space. In some cases, UE 215 may estimate and select one or more positions where candidate downlink control information is to be transmitted to UE 215 from base station 205 without analyzing an overlap between a first control resource set and a second control resource set. In some cases, UE 215 may perform blind decoding of portions of the first control resource set associated with one or more positions where candidate DCI is to be transmitted to UE 215 and that is non-overlapping with the second control resource set. In some cases, UE 215 may perform blind decoding of portions of the first control resource set associated with one or more positions where candidate control information is to be transmitted to UE 215 and that is partially overlapping with the second control resource set.

According to a first technique, in the case of partial and full overlap, UE 215 may modify a search space. UE 215 may assume candidate downlink control information transmission locations in the control resource set 525-*a* are selected without considering the overlapping with the control resource set 520-*a*. As such, UE 215 may perform blind decoding of downlink control information (e.g., DCI-0, DCI-1, and DCI-2) only at candidate downlink control information transmissions where the resources (e.g., time and frequency) used by the candidate downlink control information transmission is not overlapping with the control resource set 520-*a*. That is, UE 215 may refrain from using DCI-1 530-*a* as it partially overlaps with the control resource set 520-*a*. Similarly, UE 215 may refrain from using DCI-0 535-*a* as it fully overlaps with control resource set 520-*a*. In the non-overlapping scenario, the search space configured for UE 215 may be unchanged. As such, UE 215 may decode control information (e.g., DCI) associated with a control resource set. For example, UE 215 may use DCI-2 540-*a* as it is non-overlapping with control resource set 520-*a*.

According to a second technique, in the case of partial and full overlap, UE 215 may assume that candidate control information transmission locations in the control resource set 525-*b* are selected without considering the overlapping with the control resource set 520-*b*. As such, UE 215 may perform blind decoding of control information only at candidate control information transmission where the resources used by the candidate control information transmission is not fully overlapping with the control resource set 520-*b*. When a candidate control information transmission is partially overlapping with the control resource set 520-*b*, UE 215 may perform the blind decoding of the control information assuming the control information is transmitted within the non-overlapping portion of the resources allocated to the candidate control information transmission. In this case, for example, UE 215 may only use a non-overlapping portion 550 of DCI-1 530-*b* and refrain from using the overlapping portion of DCI-1 530-*b*. Additionally, UE 215 may use DCI-2 540-*b* as it is still non-overlapping with control resource set 520-*b*. Similarly, UE 215 may refrain from using DCI-0 535-*b* as it fully overlaps with control resource set 520-*b*. Returning to FIG. 2, after UE 215 successfully decodes the control information received from base station 205 via one or more control resource sets, UE 215 may receive data from base station 205. According to the principles of this disclosure, UE 215 communicating with base station 205 in system 200 may support overlapping control resource sets based on priority levels assigned to each control resource set. UE 215 may also support rate matching on the overlapping control resource sets.

Figure 6:
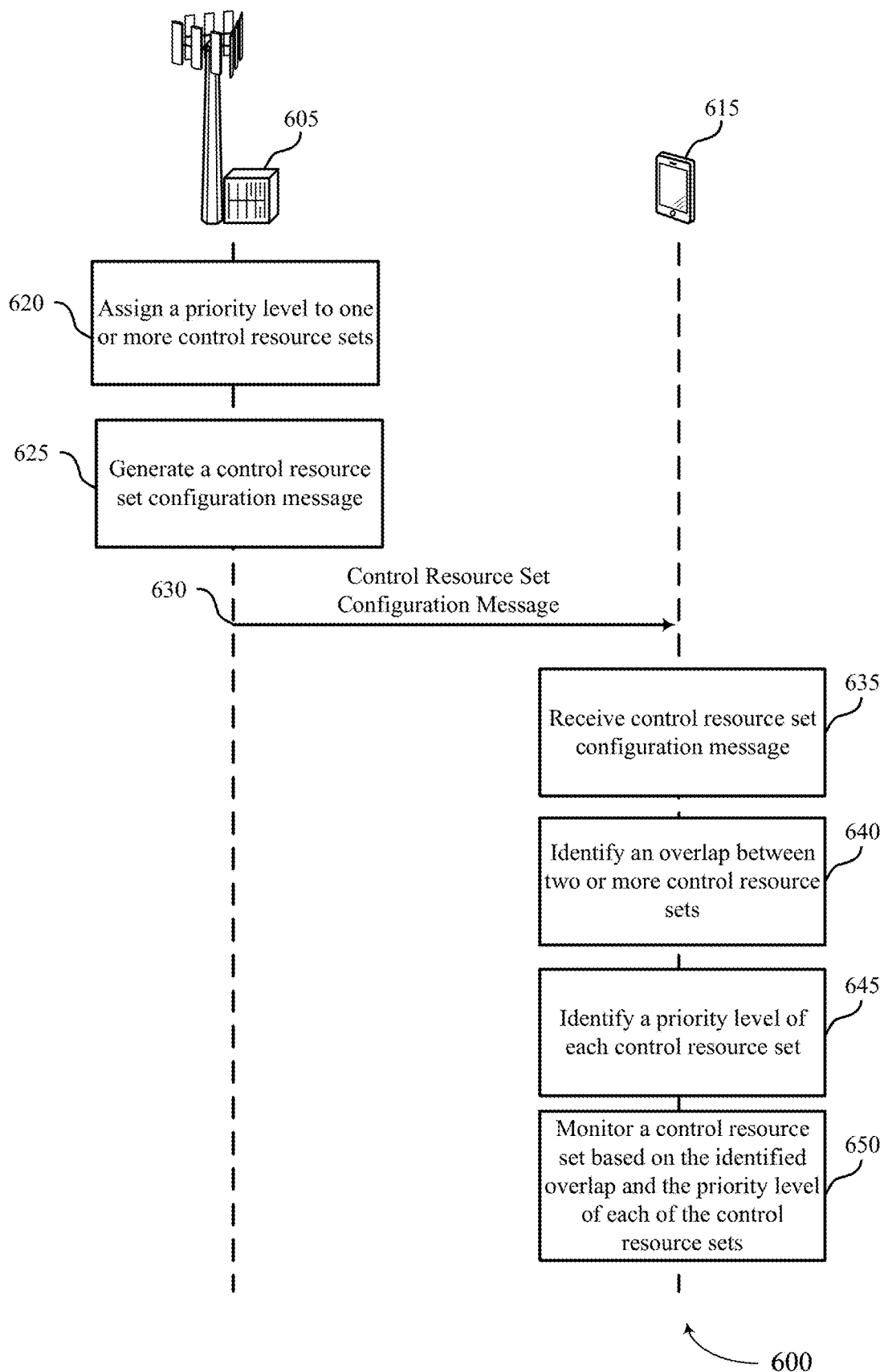
FIG. 6 illustrates an example of a process flow that supports managing overlapping control resource sets with different priority levels in accordance with aspects of the present disclosure.

FIG. 6 illustrates an example of a process flow 600 that supports managing overlapping control resource sets with different priority levels in accordance with aspects of the present disclosure. In some examples, process flow 600 may implement aspects of system 100 and 200. Base station 605 and UE 615 may be examples of the corresponding devices described with reference to FIGS. 1 and 2.

In the following description of the process flow 600, the operations between the base station 605 and UE 615 may be transmitted in a different order than the exemplary order shown, or the operations performed by base station 605 and UE 615 may be performed in different orders or at different times. Certain operations may also be left out of the process flow 600, or other operations may be added to the process flow 600. In some examples, process flow 600 may commence with base station 605 establishing a connection with UE 615. Base station 605 may provide radio resources to UE 615 for respective uplink communications. In an example, base station 605 may also provide radio resources to UE 615 for respective downlink communications.

At 620, base station 605 may assign a priority level to one or more control resource sets. For example, base station 605 may assign a first priority level to a first control resource set and a second priority level to a second control resource set. At 625, base station 605 may generate a control resource configuration message. The configuration message may include indication of a priority level of one or more of the control resource sets of a wireless channel. At 630, base station 605 may transmit the control resource configuration message to UE 615.

At 635, UE 615 may receive the control resource set configuration message. At 640, UE 615 may identify an overlap between two or more control resource sets. For example, UE 615 may identify an overlap between the first control resource set and the second control resource set. At 645, UE 615 may identify a priority level of each control resource set. In some cases, the UE 615 may identify the priority level based on the configuration message. For example, the UE 615 may identify a priority level of the first control resource set and a priority level of the second control resource set based on the control resource set configuration message.

At 650, UE 615 may monitor a control resource set based on the identified overlap, and the priority level of each of the control resource sets. In some cases, UE 615 may monitor the first control resource set based on the identified overlap, the priority level of the first control resource set, and the priority level of the second control resource set. In some cases, UE 615 may determine that the identified priority level of the first control resource set is lower than the identified priority level of the second control resource set; and identify a portion of overlapping resources associated with the first control resource set and the second control resource set. The UE 615 may remove from the first control resource set the portion of overlapping resources associated with the first control resource set. The portion of overlapping resources may overlap with a portion of the second control resource set. As a result, the UE 615 may obtain the remaining portion of the first control resource set based on the removed overlapping resources. The remaining portion of the first control resource set may include a portion of non-overlapping resources.

Figure 7:
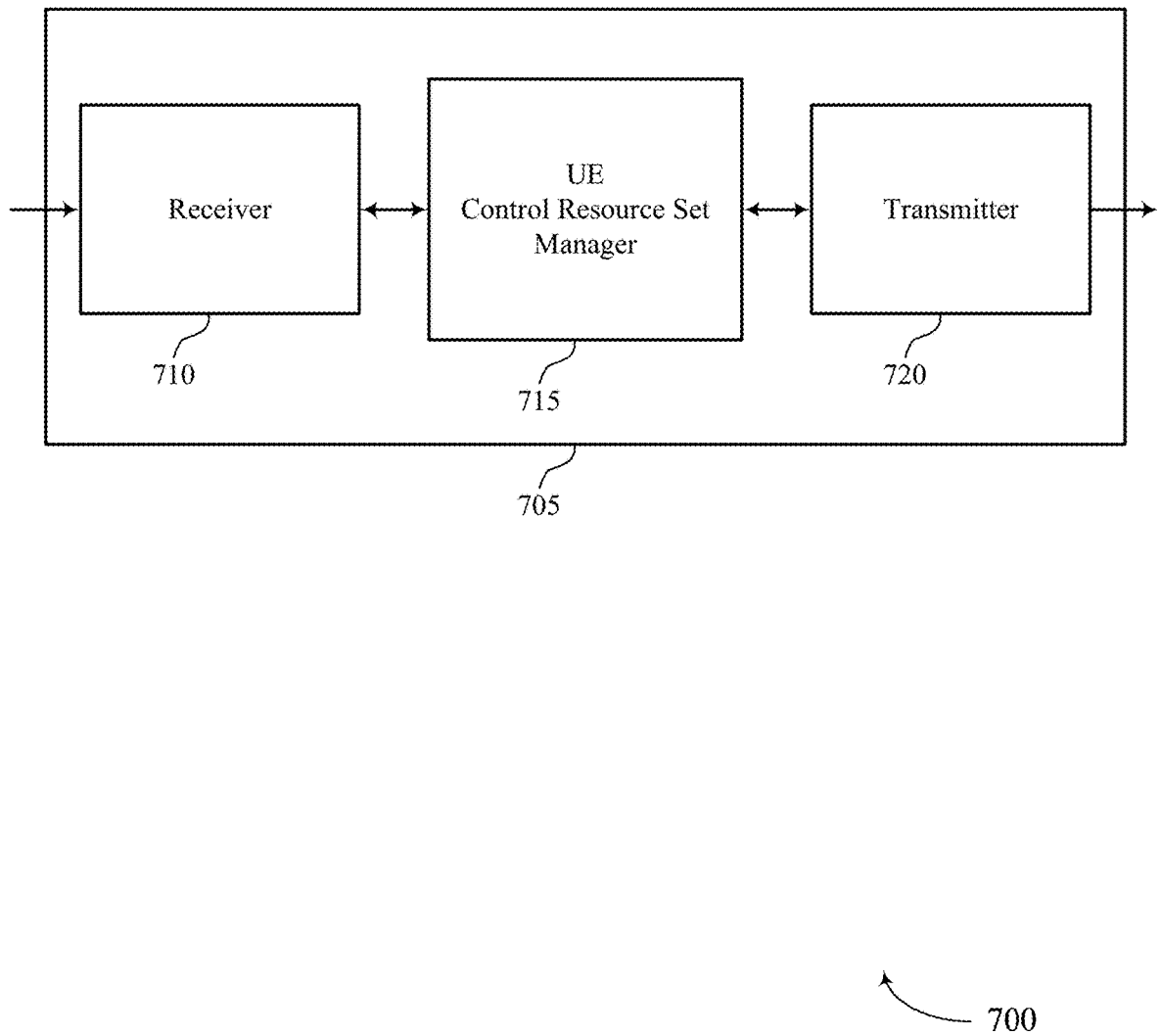
FIGS. 7 through 9 show block diagrams of a device that supports managing overlapping control resource sets with different priority levels in accordance with aspects of the present disclosure.

FIG. 7 shows a block diagram 700 of a wireless device 705 that supports managing overlapping control resource sets with different priority levels in accordance with aspects of the present disclosure. Wireless device 705 may be an example of aspects of a UE 115 as described herein. Wireless device 705 may include receiver 710, UE control resource set manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to managing overlapping control resource sets with different priority levels, etc.). Information may be passed on to other components of the device. The receiver 710 may be an example of aspects of the transceiver 1035 described with reference to FIG. 10. The receiver 710 may utilize a single antenna or a set of antennas.

UE control resource set manager 715 and/or at least some of its various sub-components may be implemented in hardware, software executed by a processor, firmware, or any combination thereof. If implemented in software executed by a processor, the functions of the UE control resource set manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE control resource set manager 715 and/or at least some of its various sub-components may be physically located at various positions, including being distributed such that portions of functions are implemented at different physical locations by one or more physical devices. In some examples, UE control resource set manager 715 and/or at least some of its various sub-components may be a separate and distinct component in accordance with various aspects of the present disclosure. In other examples, UE control resource set manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE control resource set manager 715 may receive a control resource set configuration message from a base station, identify an overlap between a first control resource set and a second control resource set of a wireless channel, identify a priority level of the first control resource set and a priority level of the second control resource set based on the control resource set configuration message, and monitor the first control resource set based on the identified overlap, the priority level of the first control resource set, and the priority level of the second control resource set.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
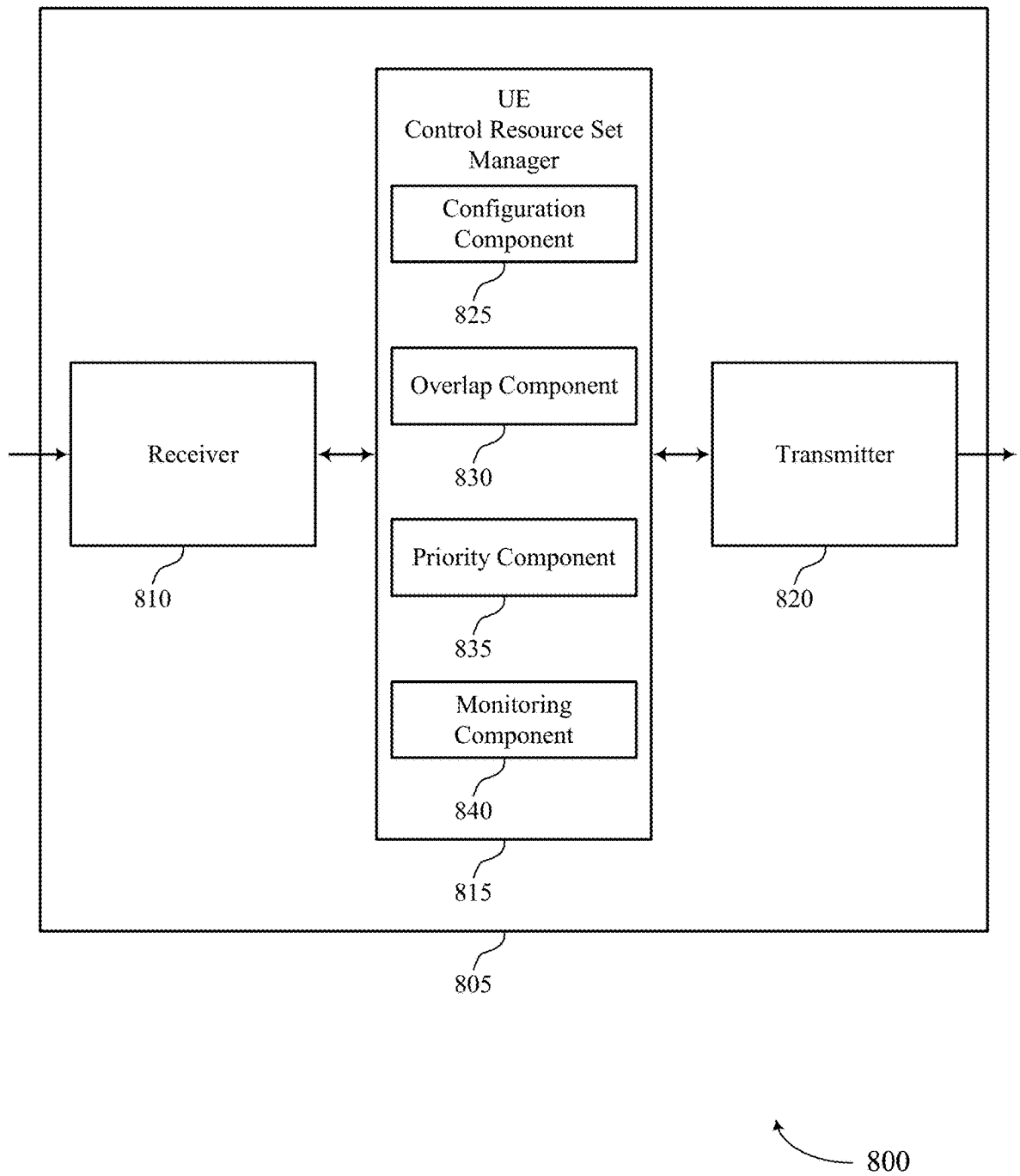

FIG. 8 shows a block diagram 800 of a wireless device 805 that supports managing overlapping control resource sets with different priority levels in accordance with aspects of the present disclosure. Wireless device 805 may be an example of aspects of a wireless device 705 or a UE 115 as described with reference to FIG. 7. Wireless device 805 may include receiver 810, UE control resource set manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to managing overlapping control resource sets with different priority levels, etc.). Information may be passed on to other components of the device. The receiver 810 may be an example of aspects of the transceiver 1035 described with reference to FIG. 10. The receiver 810 may utilize a single antenna or a set of antennas.

UE control resource set manager 815 may be an example of aspects of the UE control resource set manager 715 described with reference to FIG. 7. UE control resource set manager 815 may also include configuration component 825, overlap component 830, priority component 835, and monitoring component 840.

Configuration component 825 may receive a control resource set configuration message from a base station. In some cases, configuration component 825 may update a monitoring configuration of the UE for the first control resource set based on the identified overlapping resources, and configure the UE to refrain from monitoring a portion of the first control resource set overlapping with the second control resource set.

Overlap component 830 may identify an overlap between a first control resource set and a second control resource set of a wireless channel. Overlap component 830 may identify a portion of overlapping resources associated with the first control resource set and the second control resource set. In some cases, overlap component 830 may remove from the first control resource set the portion of overlapping resources associated with the first control resource set. The portion of overlapping resources overlap with a portion of the second control resource set, and obtain a remaining portion of the first control resource set based on the removed overlapping resources, where the remaining portion of the first control resource set includes a portion of non-overlapping resources.

Priority component 835 may identify a priority level of the first control resource set and a priority level of the second control resource set based on the control resource set configuration message and determine that the identified priority level of the first control resource set is lower than the identified priority level of the second control resource set. In some cases, the priority level of the second control resource set is based on a default priority level.

Monitoring component 840 may monitor the first control resource set based on the identified overlap, the priority level of the first control resource set, and the priority level of the second control resource set. In some cases, the monitoring the first control resource set is based on determining that the identified priority level of the first control resource set and the identified priority level of the second control resource set are different.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
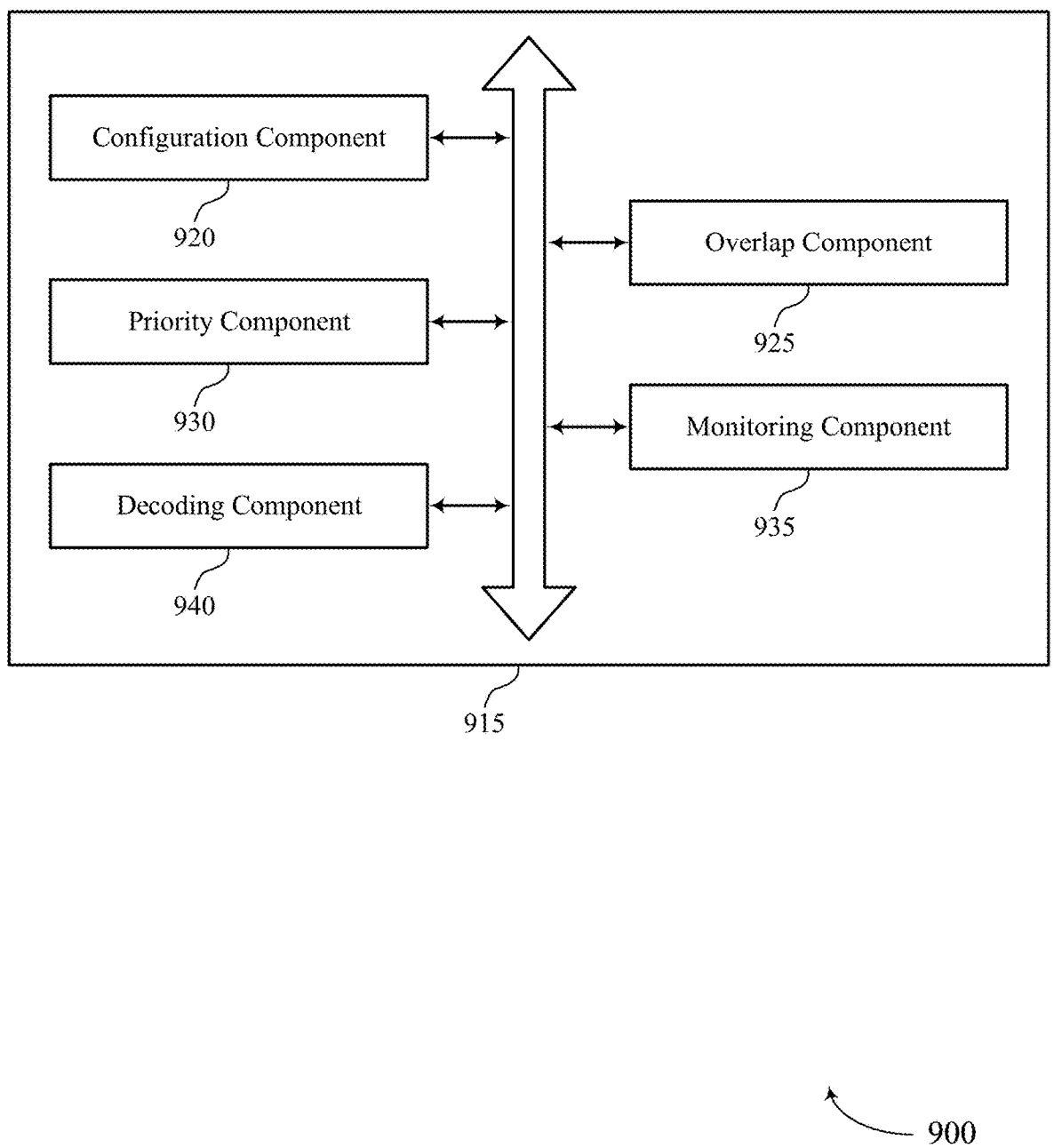

FIG. 9 shows a block diagram 900 of a UE control resource set manager 915 that supports managing overlapping control resource sets with different priority levels in accordance with aspects of the present disclosure. The UE control resource set manager 915 may be an example of aspects of a UE control resource set manager 715, a UE control resource set manager 815, or a UE control resource set manager 1015 described with reference to FIGS. 7, 8, and 10. The UE control resource set manager 915 may include configuration component 920, overlap component 925, priority component 930, monitoring component 935, and decoding component 940. Each of these modules may communicate, directly or indirectly, with one another (e.g., via one or more buses).

Configuration component 920 may receive a control resource set configuration message from a base station, update a monitoring configuration of the UE for the first control resource set based on the identified overlapping resources, and configure the UE to refrain from monitoring a portion of the first control resource set overlapping with the second control resource set.

Overlap component 925 may identify an overlap between a first control resource set and a second control resource set of a wireless channel. Overlap component 925 may identify a portion of overlapping resources associated with the first control resource set and the second control resource set. In some cases, overlap component 925 may remove from the first control resource set the portion of overlapping resources associated with the first control resource set. The portion of overlapping resources may overlap with a portion of the second control resource set. Overlap component 925 may obtain a remaining portion of the first control resource set based on the removed overlapping resources, where the remaining portion of the first control resource set includes a portion of non-overlapping resources.

Priority component 930 may identify a priority level of the first control resource set and a priority level of the second control resource set based on the control resource set configuration message and determine that the identified priority level of the first control resource set is lower than the identified priority level of the second control resource set. In some cases, the priority level of the second control resource set is based on a default priority level.

Monitoring component 935 may monitor the first control resource set based on the identified overlap, the priority level of the first control resource set, and the priority level of the second control resource set. In some cases, the monitoring the first control resource set is based on determining that the identified priority level of the first control resource set and the identified priority level of the second control resource set are different.

Decoding component 940 may perform a blind decoding of downlink control information based on all downlink control information transmissions in the first control resource set rate match around the portion of overlapping resources associated with the first control resource set. Decoding component 940 may perform a blind decoding of downlink control information based on all downlink control information transmissions in the first control resource set rate match around resources sharing a same frequency domain resource with the portion of overlapping resources associated with the first control resource set. Decoding component 940 may perform a blind decoding of downlink control information based on all downlink control information transmissions in the first control resource set rate match around resources that overlap with the second control resource set. Decoding component 940 may perform a blind decoding of downlink control information at a candidate downlink control information transmission based on a candidate downlink control information transmission location in the first control resource set are selected, where resources used by the candidate downlink control information transmission is non-overlapping with the second control resource set.

Decoding component 940 may perform a blind decoding of downlink control information at a candidate downlink control information transmission based on a candidate downlink control information transmission location in the first control resource set is selected prior to identifying the overlap with the second control resource set, where resources used by the candidate downlink control information transmission are partially overlapping with the second control resource set. Decoding component 940 may perform a blind decoding of downlink control information based on a candidate downlink control information transmission being partially overlapping with the second control resource set, where the downlink control information is being transmitted within a non-overlapping portion of resources allocated to the candidate downlink control information transmission. In some cases, the first control resource set includes a time first mapping control resource set. In some cases, the first control resource set includes a frequency first mapping control resource set.

Figure 10:
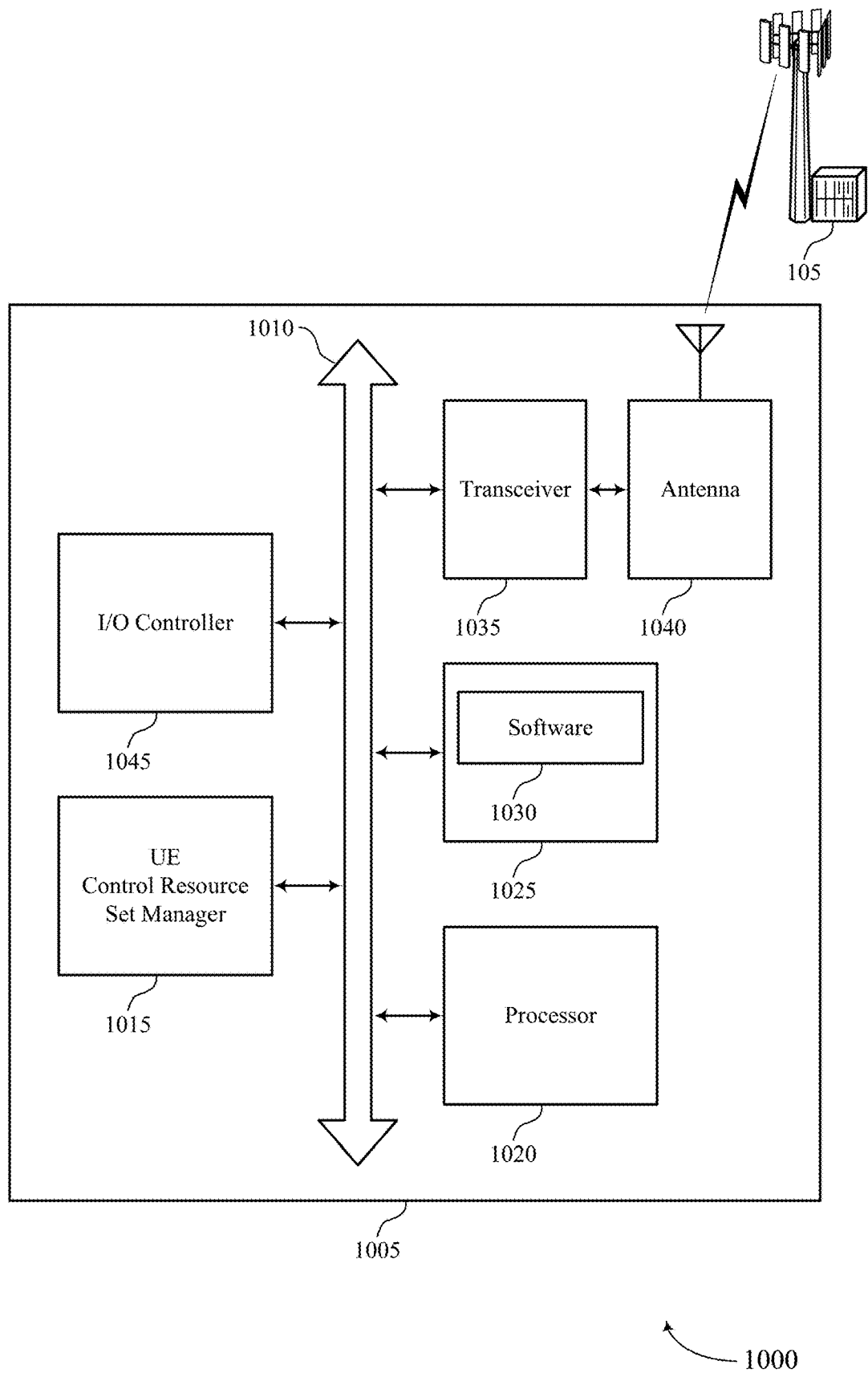
FIG. 10 illustrates a block diagram of a system including a UE that supports managing overlapping control resource sets with different priority levels in accordance with aspects of the present disclosure.

FIG. 10 shows a diagram of a system 1000 including a device 1005 that supports managing overlapping control resource sets with different priority levels in accordance with aspects of the present disclosure. Device 1005 may be an example of or include the components of wireless device 705, wireless device 805, or a UE 115 as described above, e.g., with reference to FIGS. 7 and 8. Device 1005 may include components for bi-directional voice and data communications including components for transmitting and receiving communications, including UE control resource set manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting managing overlapping control resource sets with different priority levels).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support managing overlapping control resource sets with different priority levels. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described above. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
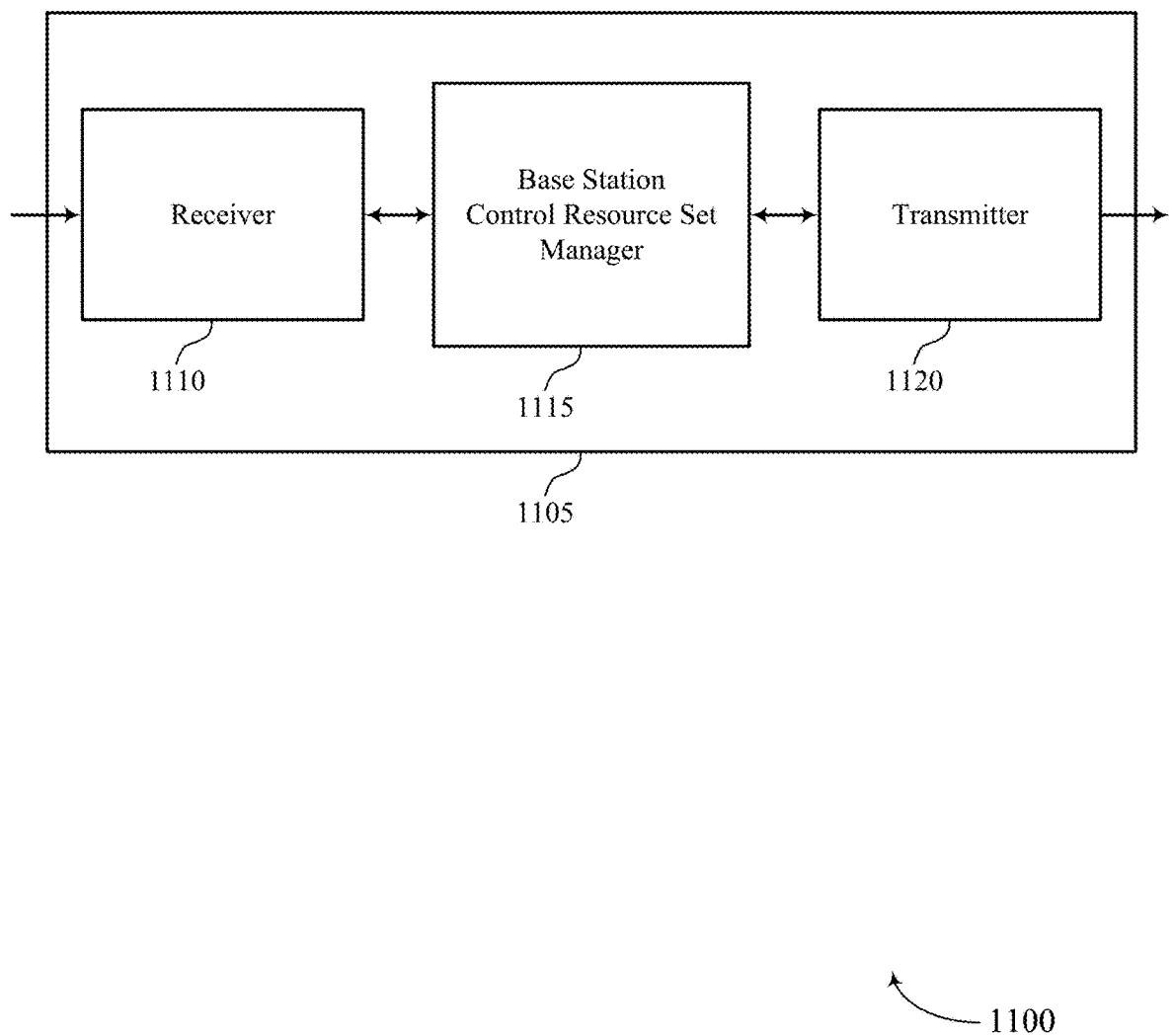
FIGS. 11 through 13 show block diagrams of a device that supports managing overlapping control resource sets with different priority levels in accordance with aspects of the present disclosure.

FIG. 11 shows a block diagram 1100 of a wireless device 1105 that supports managing overlapping control resource sets with different priority levels in accordance with aspects of the present disclosure. Wireless device 1105 may be an example of aspects of a base station 105 as described herein. Wireless device 1105 may include receiver 1110, base station control resource set manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to managing overlapping control resource sets with different priority levels, etc.). Information may be passed on to other components of the device. The receiver 1110 may be an example of aspects of the transceiver 1335 described with reference to FIG. 13. The receiver 1110 may utilize a single antenna or a set of antennas.

Base station control resource set manager 1115 and/or at least some of its various sub-components may be implemented in hardware, software executed by a processor, firmware, or any combination thereof. If implemented in software executed by a processor, the functions of the base station control resource set manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station control resource set manager 1115 and/or at least some of its various sub-components may be physically located at various positions, including being distributed such that portions of functions are implemented at different physical locations by one or more physical devices. In some examples, base station control resource set manager 1115 and/or at least some of its various sub-components may be a separate and distinct component in accordance with various aspects of the present disclosure. In other examples, base station control resource set manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station control resource set manager 1115 may assign a first priority level to a first control resource set and a second priority level to a second control resource set, generate a control resource set configuration message including an indication of a priority level of one or more of the control resource sets of a wireless channel, and transmit the control resource set configuration message to a UE over the wireless channel.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
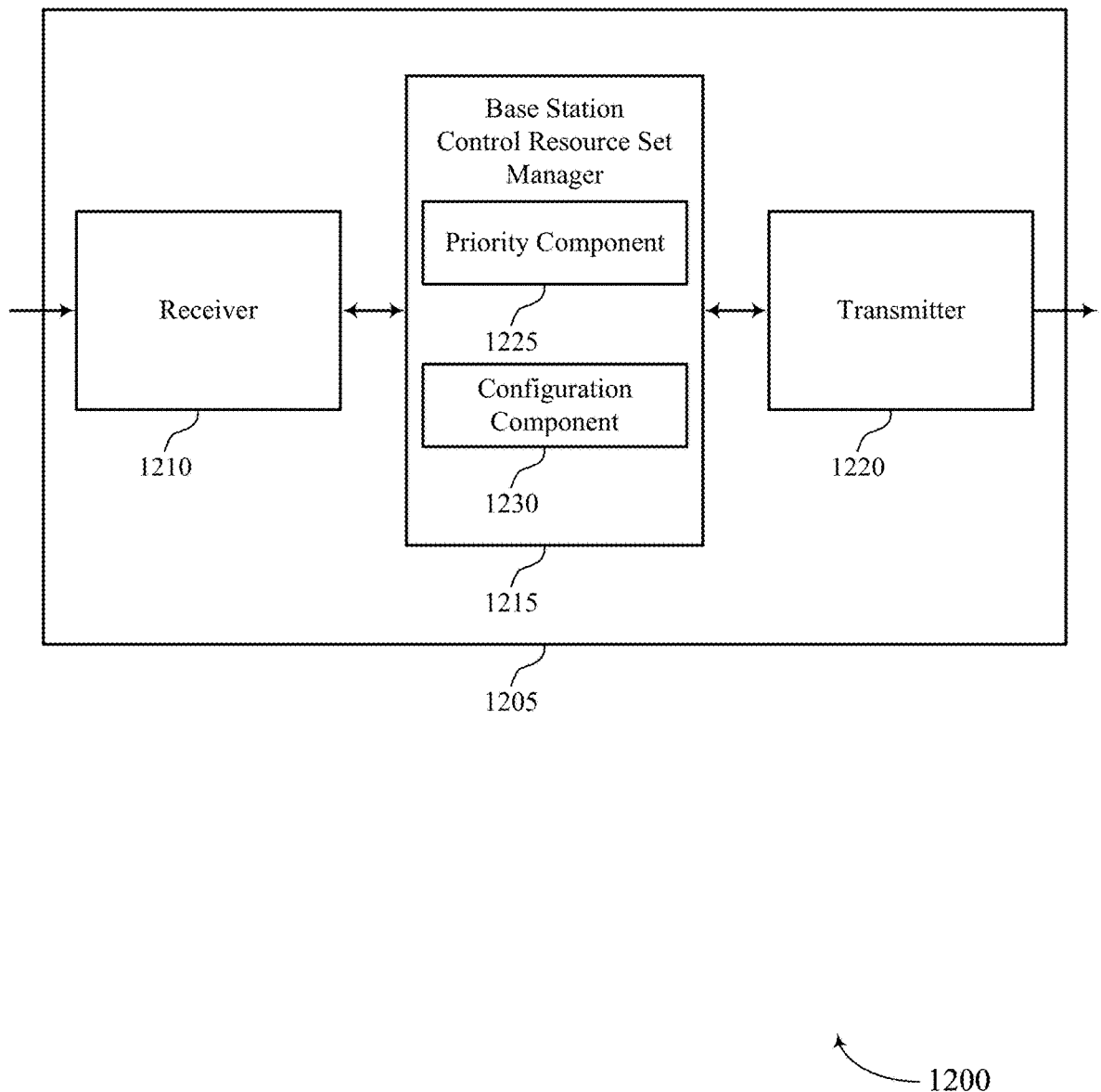

FIG. 12 shows a block diagram 1200 of a wireless device 1205 that supports managing overlapping control resource sets with different priority levels in accordance with aspects of the present disclosure. Wireless device 1205 may be an example of aspects of a wireless device 1105 or a base station 105 as described with reference to FIG. 11. Wireless device 1205 may include receiver 1210, base station control resource set manager 1215, and transmitter 1220. Wireless device 1205 may also include a processor. Each of these components may be in communication with one another (e.g., via one or more buses).

Receiver 1210 may receive information such as packets, user data, or control information associated with various information channels (e.g., control channels, data channels, and information related to managing overlapping control resource sets with different priority levels, etc.). Information may be passed on to other components of the device. The receiver 1210 may be an example of aspects of the transceiver 1335 described with reference to FIG. 13. The receiver 1210 may utilize a single antenna or a set of antennas.

Base station control resource set manager 1215 may be an example of aspects of the base station control resource set manager 1115 described with reference to FIG. 11. Base station control resource set manager 1215 may also include priority component 1225 and configuration component 1230.

Priority component 1225 may assign a first priority level to a first control resource set and a second priority level to a second control resource set and assign a default priority level to at least one control resource set, where the control resource set configuration message includes an indication of the default priority level of the at least one control resource set.

Configuration component 1230 may generate a control resource set configuration message including an indication of a priority level of one or more of the control resource sets of a wireless channel, transmit the control resource set configuration message to a UE over the wireless channel, and configure the UE to refrain from monitoring a portion of a first control resource set overlapping with a second control resource set. In some cases, the control resource set configuration message is transmitted during a radio resource control (RRC) connection procedure. In some cases, the first control resource set or the second control resource set is UE-specific. In some cases, the first control resource set or the second control resource set is a common control resource set.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1335 described with reference to FIG. 13. The transmitter 1220 may utilize a single antenna or a set of antennas.

Figure 13:
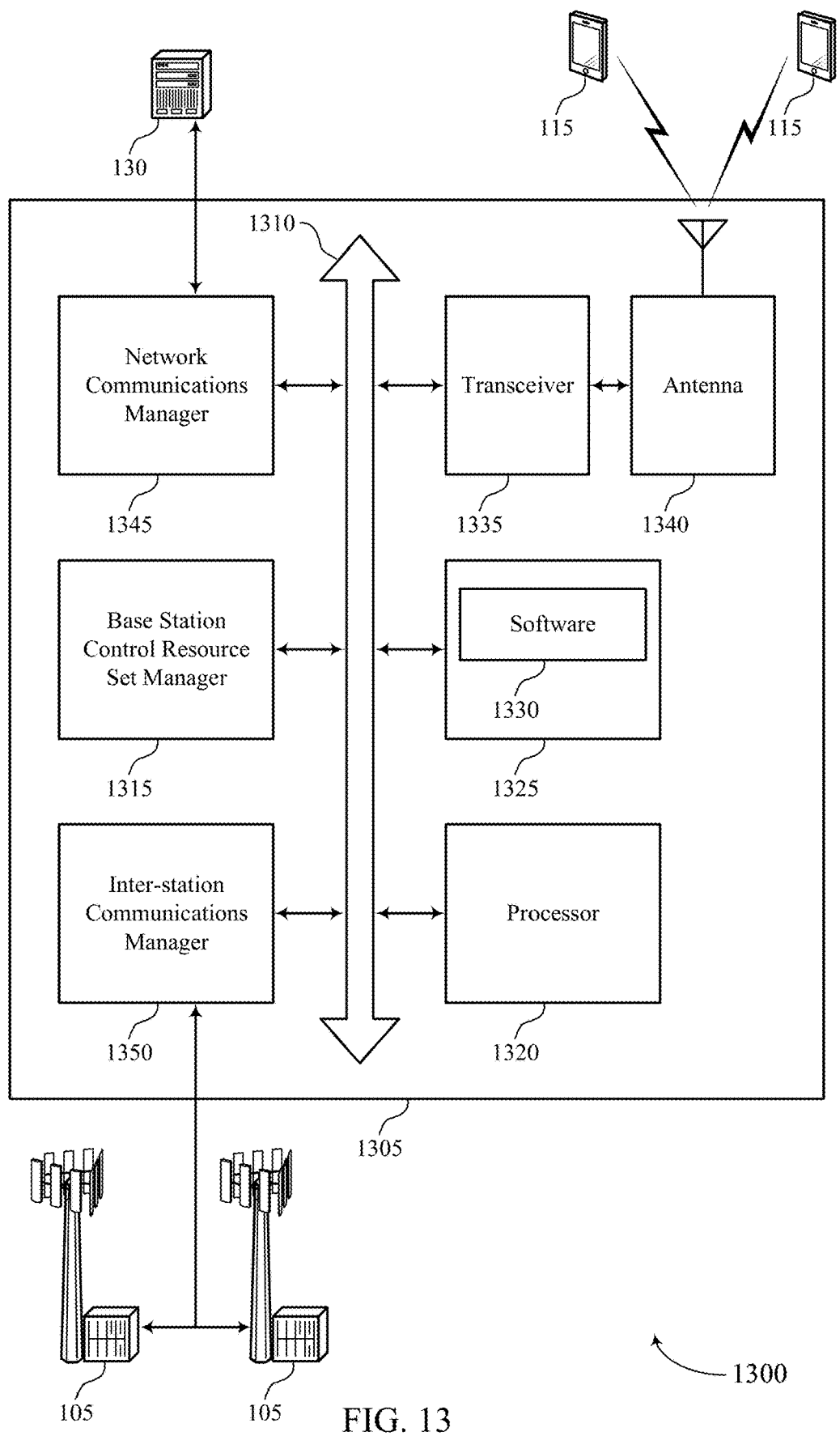

FIG. 13 shows a diagram of a system 1300 including a device 1305 that supports managing overlapping control resource sets with different priority levels in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station control resource set manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting managing overlapping control resource sets with different priority levels).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support managing overlapping control resource sets with different priority levels. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas. In some cases, the wireless device may include a single antenna 1340. However, in some cases the device may have more than one antenna 1340, which may be capable of concurrently transmitting or receiving multiple wireless transmissions. Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
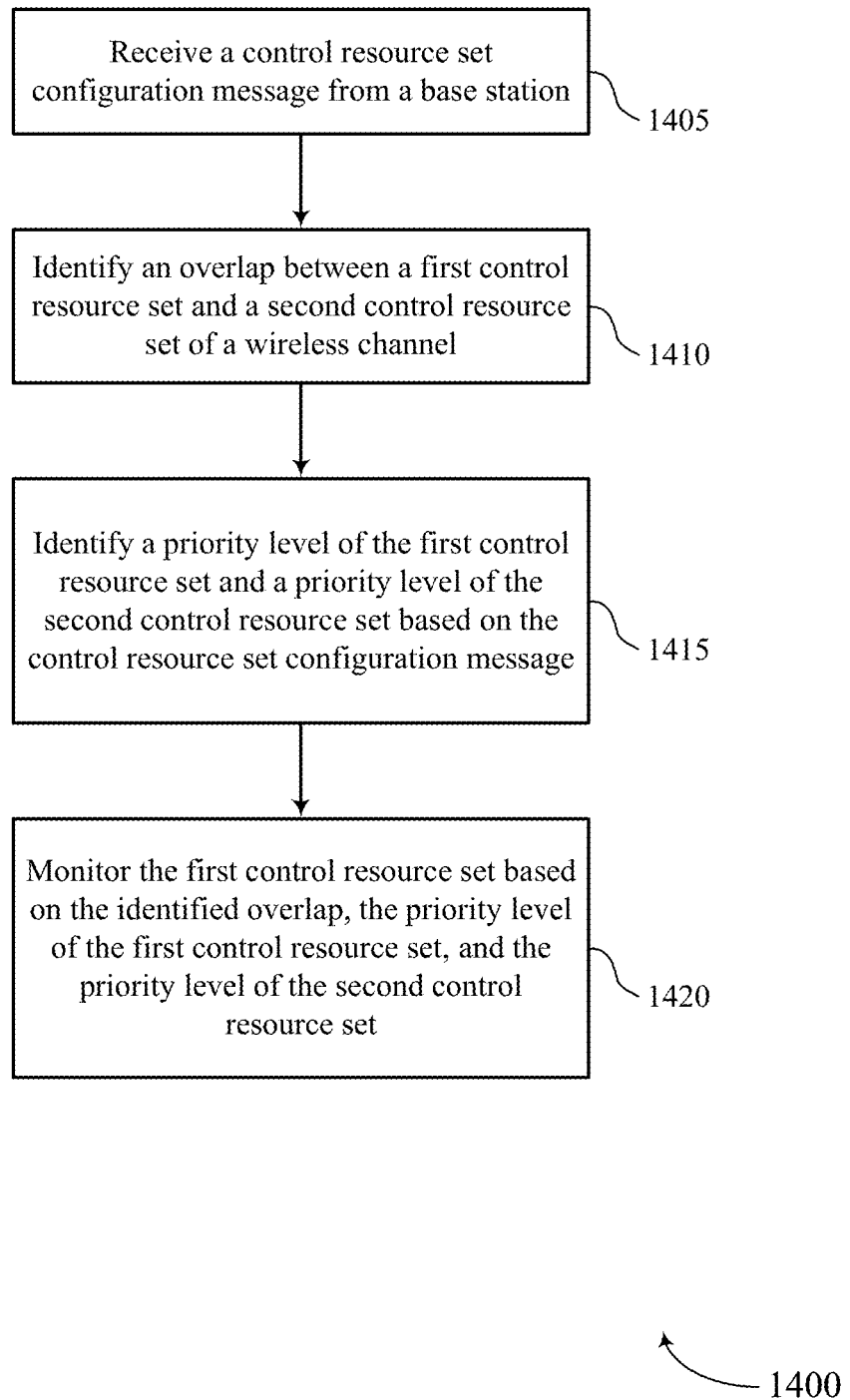
FIGS. 14 through 16 illustrate methods for managing overlapping control resource sets with different priority levels in accordance with aspects of the present disclosure.

FIG. 14 shows a flowchart illustrating a method 1400 for managing overlapping control resource sets with different priority levels in accordance with aspects of the present disclosure. The operations of method 1400 may be implemented by a UE 115 or its components as described herein. For example, the operations of method 1400 may be performed by a UE control resource set manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive a control resource set configuration message from a base station. The operations of block 1405 may be performed according to the methods described herein. In certain examples, aspects of the operations of block 1405 may be performed by a configuration component as described with reference to FIGS. 7 through 10.

At block 1410 the UE 115 may identify an overlap between a first control resource set and a second control resource set of a wireless channel. The operations of block 1410 may be performed according to the methods described herein. In certain examples, aspects of the operations of block 1410 may be performed by an overlap component as described with reference to FIGS. 7 through 10.

At block 1415 the UE 115 may identify a priority level of the first control resource set and a priority level of the second control resource set based on the control resource set configuration message. The operations of block 1415 may be performed according to the methods described herein. In certain examples, aspects of the operations of block 1415 may be performed by a priority component as described with reference to FIGS. 7 through 10.

At block 1420 the UE 115 may monitor the first control resource set based on the identified overlap, the priority level of the first control resource set, and the priority level of the second control resource set. The operations of block 1420 may be performed according to the methods described herein. In certain examples, aspects of the operations of block 1420 may be performed by a monitoring component as described with reference to FIGS. 7 through 10.

Figure 15:
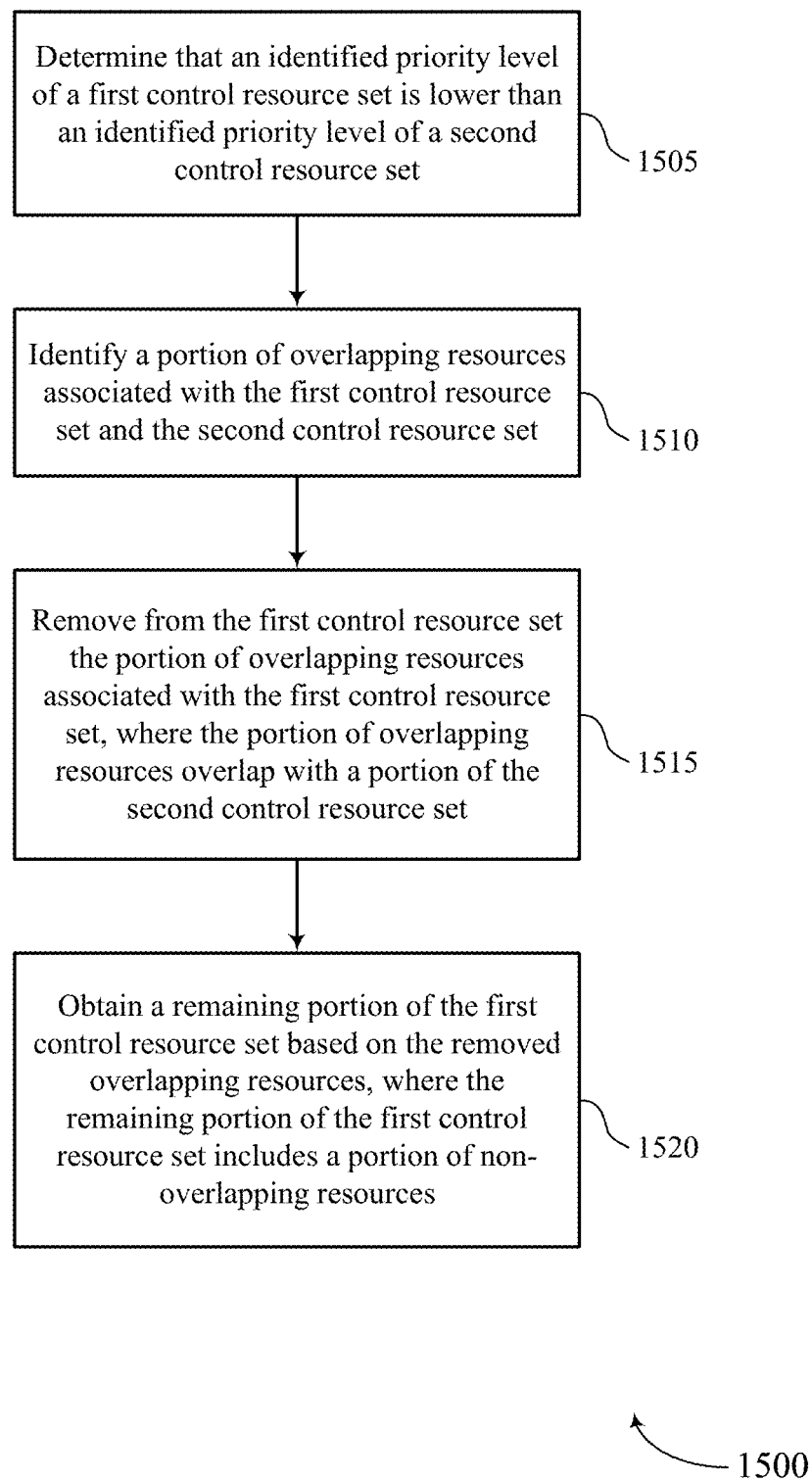

FIG. 15 shows a flowchart illustrating a method 1500 for managing overlapping control resource sets with different priority levels in accordance with aspects of the present disclosure. The operations of method 1500 may be implemented by a UE 115 or its components as described herein. For example, the operations of method 1500 may be performed by a UE control resource set manager as described with reference to FIGS. 7 through 10. In some examples, a UE 115 may execute a set of codes to control the functional elements of the device to perform the functions described below. Additionally or alternatively, the UE 115 may perform aspects of the functions described below using special-purpose hardware.

At block 1505 the UE 115 may determine that an identified priority level of a first control resource set is lower than an identified priority level of a second control resource set. The operations of block 1505 may be performed according to the methods described herein. In certain examples, aspects of the operations of block 1505 may be performed by a priority component as described with reference to FIGS. 7 through 10.

At block 1510 the UE 115 may identify a portion of overlapping resources associated with the first control resource set and the second control resource set. The operations of block 1510 may be performed according to the methods described herein. In certain examples, aspects of the operations of block 1510 may be performed by an overlap component as described with reference to FIGS. 7 through 10.

At block 1515 the UE 115 may remove from the first control resource set the portion of overlapping resources associated with the first control resource set, wherein the portion of overlapping resources overlap with a portion of the second control resource set. The operations of block 1515 may be performed according to the methods described herein. In certain examples, aspects of the operations of block 1515 may be performed by an overlap component as described with reference to FIGS. 7 through 10.

At block 1520 the UE 115 may obtain a remaining portion of the first control resource set based on the removed overlapping resources, wherein the remaining portion of the first control resource set include a portion of non-overlapping resources. The operations of block 1520 may be performed according to the methods described herein. In certain examples, aspects of the operations of block 1520 may be performed by an overlap component as described with reference to FIGS. 7 through 10.

In some cases, the monitoring the first control resource set is based on determining that the identified priority level of the first control resource set and the identified priority level of the second control resource set are different.

Figure 16:
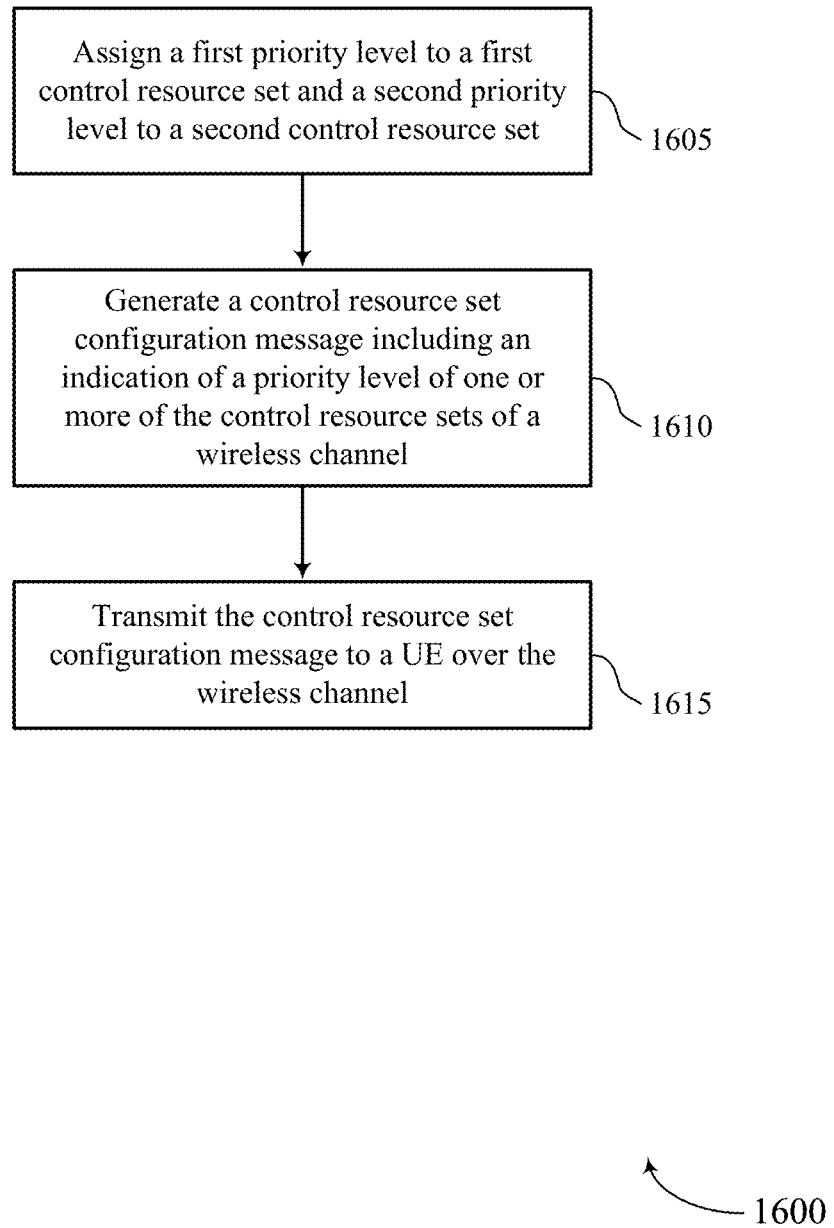

FIG. 16 shows a flowchart illustrating a method 1600 for managing overlapping control resource sets with different priority levels in accordance with aspects of the present disclosure. The operations of method 1600 may be implemented by a base station 105 or its components as described herein. For example, the operations of method 1600 may be performed by a base station control resource set manager as described with reference to FIGS. 11 through 13. In some examples, a base station 105 may execute a set of codes to control the functional elements of the device to perform the functions described below. Additionally or alternatively, the base station 105 may perform aspects of the functions described below using special-purpose hardware.

At block 1605 the base station 105 may assign a first priority level to a first control resource set and a second priority level to a second control resource set. The operations of block 1605 may be performed according to the methods described herein. In certain examples, aspects of the operations of block 1605 may be performed by a priority component as described with reference to FIGS. 11 through 13.

At block 1610 the base station 105 may generate a control resource set configuration message including an indication of a priority level of one or more of the control resource sets of a wireless channel. The operations of block 1610 may be performed according to the methods described herein. In certain examples, aspects of the operations of block 1610 may be performed by a configuration component as described with reference to FIGS. 11 through 13.

At block 1615 the base station 105 may transmit the control resource set configuration message to a UE over the wireless channel. The operations of block 1615 may be performed according to the methods described herein. In certain examples, aspects of the operations of block 1615 may be performed by a configuration component as described with reference to FIGS. 11 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a control resource set configuration message from a base station;
   identifying an overlap between a first control resource set and a second control resource set of a wireless channel;
   identifying a priority level of the first control resource set and a priority level of the second control resource set based at least in part on the control resource set configuration message; and
   monitoring the first control resource set based at least in part on the identified overlap, the priority level of the first control resource set, and the priority level of the second control resource set.

2. The method of claim 1, wherein monitoring the first control resource set is based at least in part on determining that the identified priority level of the first control resource set and the identified priority level of the second control resource set are different.

3. The method of claim 2, wherein monitoring the first control resource set comprises:
   determining that the identified priority level of the first control resource set is lower than the identified priority level of the second control resource set;
   identifying a portion of overlapping resources associated with the first control resource set and the second control resource set;
   removing from the first control resource set the portion of overlapping resources associated with the first control resource set, wherein the portion of overlapping resources overlap with a portion of the second control resource set; and
   obtaining a remaining portion of the first control resource set based at least in part on the removed overlapping resources, wherein the remaining portion of the first control resource set comprises a portion of non-overlapping resources.

4. The method of claim 1, further comprising:
   updating a monitoring configuration of the UE for the first control resource set based at least in part on the identified overlapping resources.

5. The method of claim 4, wherein updating the monitoring configuration comprises:
   configuring the UE to refrain from monitoring a portion of the first control resource set overlapping with the second control resource set.

6. The method of claim 1, further comprising:
   performing a blind decoding of downlink control information based at least in part on all downlink control information transmissions in the first control resource set rate match around the portion of overlapping resources associated with the first control resource set.

7. The method of claim 1, wherein the first control resource set comprises a time first mapping control resource set.

8. The method of claim 7, further comprising:
   performing a blind decoding of downlink control information based at least in part on all downlink control information transmissions in the first control resource set rate match around resources sharing a same frequency domain resource with the portion of overlapping resources associated with the first control resource set.

9. The method of claim 1, wherein the first control resource set comprises a frequency first mapping control resource set.

10. The method of claim 9, further comprising:
    performing a blind decoding of downlink control information based at least in part on all downlink control information transmissions in the first control resource set rate match around resources that overlap with the second control resource set.

11. The method of claim 1, further comprising:
    performing a blind decoding of downlink control information at a candidate downlink control information transmission based at least in part on a candidate downlink control information transmission location in the first control resource set are selected, wherein resources used by the candidate downlink control information transmission is non-overlapping with the second control resource set.

12. The method of claim 11, further comprising:
    performing a blind decoding of downlink control information at a candidate downlink control information transmission based at least in part on a candidate downlink control information transmission location in the first control resource set is selected prior to identifying the overlap with the second control resource set, wherein resources used by the candidate downlink control information transmission are partially overlapping with the second control resource set.

13. The method of claim 11, further comprising:
    performing a blind decoding of downlink control information based at least in part on a candidate downlink control information transmission being partially overlapping with the second control resource set, wherein the downlink control information is being transmitted within a non-overlapping portion of resources allocated to the candidate downlink control information transmission.

14. The method of claim 1, wherein the priority level of the second control resource set is based at least in part on a default priority level.

15. A method for wireless communication, comprising:
    generating a control resource set configuration message comprising an indication of a priority level of a first control resource set and a priority level of a second control resource set of a wireless channel;
    transmitting the control resource set configuration message to a user equipment (UE) over the wireless channel; and
    configuring the UE to monitor the first control resource set based at least in part on an overlap between the first control resource set and the second control resource set, the priority level of the first control resource set, and the priority level of the second control resource set.

16. The method of claim 15, further comprising:
configuring the UE to refrain from monitoring a portion of the first control resource set overlapping with the second control resource set.

17. The method of claim 16, wherein configuring the UE comprises configuring the UE to monitor portions of the first control resource set that do not overlap with the second control resource set.

18. The method of claim 15, further comprising:
assigning the first priority level to the first control resource set and the second priority level to the second control resource set.

19. The method of claim 18, wherein the first priority and the second priority are assigned based on a type associated with the first control resource set and a type associated with the second control resource set.

20. The method of claim 19, wherein the type of the first control resource set is one of UE-specific or common and the type of the second control resource set is one of UE-specific or common.

21. The method of claim 20, wherein assigning the first priority level to the first control resource set and the second priority level to the second control resource set comprises:
assigning a higher priority to a common resource set than to a UE-specific control resource set.

22. The method of claim 18, further comprising:
configuring the UE to disregard the second control resource set.

23. The method of claim 18, further comprising:
configuring the UE to monitor the second control resource set.

24. The method of claim 18, wherein the first control resource set has a first priority, the second control resource set has a second priority, and the second priority is higher than the first priority.

25. The method of claim 24, further comprising:
configuring the UE to disregard the second control resource set.

26. The method of claim 24, further comprising:
configuring the UE to monitor the second control resource set.

27. An apparatus for wireless communication, comprising:
a processor;
memory in electronic communication with the processor; and
instructions stored in the memory and operable, when executed by the processor, to cause the apparatus to:
receive a control resource set configuration message from a base station;
identify an overlap between a first control resource set and a second control resource set of a wireless channel;
identify a priority level of the first control resource set and a priority level of the second control resource set based at least in part on the control resource set configuration message; and
monitor the first control resource set based at least in part on the identified overlap, the priority level of the first control resource set, and the priority level of the second control resource set.

28. The apparatus of claim 27, wherein the monitoring the first control resource set is based at least in part on determining that the identified priority level of the first control resource set and the identified priority level of the second control resource set are different.

29. The apparatus of claim 28, wherein the instructions are further executable by the processor to:
determine that the identified priority level of the first control resource set is lower than the identified priority level of the second control resource set;
identify a portion of overlapping resources associated with the first control resource set and the second control resource set;
remove from the first control resource set the portion of overlapping resources associated with the first control resource set, wherein the portion of overlapping resources overlap with a portion of the second control resource set; and
obtain a remaining portion of the first control resource set based at least in part on the removed overlapping resources, wherein the remaining portion of the first control resource set comprises a portion of non-overlapping resources.

30. The apparatus of claim 27, wherein the instructions are further executable by the processor to:
update a monitoring configuration of the UE for the first control resource set based at least in part on the identified overlapping resources.

31. The apparatus of claim 30, wherein the instructions are further executable by the processor to:
configure the UE to refrain from monitoring a portion of the first control resource set overlapping with the second control resource set.

32. An apparatus for wireless communication, comprising:
a processor;
memory in electronic communication with the processor; and
instructions stored in the memory and operable, when executed by the processor, to cause the apparatus to:
generate a control resource set configuration message comprising an indication of a priority level of a first control resource set and a priority level of a second control resource set of a wireless channel; transmit the control resource set configuration message to a user equipment (UE) over the wireless channel; and
configure the UE to monitor the first control resource set based at least in part on an overlap between the first control resource set and the second control resource set, the priority level of the first control resource set, and the priority level of the second control resource set.

33. The apparatus of claim 32, wherein the instructions stored in the memory are further operable, when executed by the processor, to cause the apparatus to:
assign the first priority level to the first control resource set and the second priority level to the second control resource set.

34. The apparatus of claim 33, wherein the first priority and the second priority are assigned based on a type associated with the first control resource set and a type associated with the second control resource set.

35. The apparatus of claim 34, wherein the type of the first control resource set is one of UE-specific or common and the type of the second control resource set is one of UE-specific or common.

36. The apparatus of claim 35, wherein the instructions stored in the memory are further operable, when executed by the processor, to cause the apparatus to:

assign the first priority level to the first control resource set and the second priority level to the second control resource set by assigning a higher priority to a common resource set than to a UE-specific control resource set.

* * * * *